(12) United States Patent
Ozawa et al.

(10) Patent No.: US 11,073,184 B2
(45) Date of Patent: Jul. 27, 2021

(54) POWER TRANSMISSION DEVICE

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Makoto Kataoka, Hamamatsu (JP); Masataka Murai, Hamamatsu (JP); Kaoru Aono, Hamamatsu (JP); Yuta Kine, Hamamatsu (JP); Yuta Yokomichi, Hamamatsu (JP)

(73) Assignee: Kabushiki Kaisha F.C.C., Hamamatsu (JP)

(*) Notice: Subject to any disclaimer, the term of this patent is extended or adjusted under 35 U.S.C. 154(b) by 0 days.

(21) Appl. No.: 16/804,069

(22) Filed: Feb. 28, 2020

(65) Prior Publication Data

US 2020/0200226 A1 Jun. 25, 2020

Related U.S. Application Data

(63) Continuation of application No. PCT/JP2018/032061, filed on Aug. 30, 2018.

(30) Foreign Application Priority Data

Sep. 1, 2017 (JP) .............................. JP2017-168794

(51) Int. Cl.
*F16D 43/22* (2006.01)
*F16D 11/00* (2006.01)
*F16D 19/00* (2006.01)
*F16D 21/08* (2006.01)
*F16D 25/0638* (2006.01)
*F16D 43/21* (2006.01)
(Continued)

(52) U.S. Cl.
CPC .............. *F16D 43/22* (2013.01); *F16D 11/00* (2013.01); *F16D 13/52* (2013.01); *F16D 19/00* (2013.01);
(Continued)

(58) Field of Classification Search
CPC ........... F16D 2023/123; F16D 2300/24; F16D 43/216; F16D 43/22; F16D 43/12; F16D 13/52; F16D 2013/565
See application file for complete search history.

(56) References Cited

U.S. PATENT DOCUMENTS

2009/0000898 A1* 1/2009 Inomori .................. F16D 43/12
192/70.11
2009/0242349 A1 10/2009 Miyazaki et al.
2015/0337910 A1 11/2015 Yoshimoto et al.

FOREIGN PATENT DOCUMENTS

CN 101545512 A 9/2009
CN 104350300 A 2/2015
(Continued)

OTHER PUBLICATIONS

International Search Report dated Nov. 20, 2018 in corresponding PCT Application No. PCT/JP2018/032061.
(Continued)

*Primary Examiner* — Timothy Hannon
(74) *Attorney, Agent, or Firm* — Harness, Dickey & Pierce, P.L.C.

(57) ABSTRACT

A power transmission device has a back torque transmission cam that brings driving clutch plates 6 and driven clutch plates 7 into press contact with each other. This occurs by moving a second clutch member 4b when a rotational force is input to a first clutch member 4a, via the output shaft 3. A pressure member 5 is located at a non-actuation position. A back torque transmission cam can hold abutment between an interlocking member 9 and weight member 8 by moving the second clutch member 4b in a direction of being brought into proximity to the interlocking member 9.

5 Claims, 24 Drawing Sheets

(51) Int. Cl.
  *F16D 43/12* (2006.01)
  *F16D 13/52* (2006.01)
  *F16D 13/56* (2006.01)
  *F16D 23/12* (2006.01)

(52) U.S. Cl.
  CPC ......... *F16D 21/08* (2013.01); *F16D 25/0638* (2013.01); *F16D 43/12* (2013.01); *F16D 43/216* (2013.01); *F16D 2013/565* (2013.01); *F16D 2023/123* (2013.01)

(56) References Cited

FOREIGN PATENT DOCUMENTS

| JP | 42-014016 | 8/1967 |
| JP | 45-007528 | 4/1970 |
| JP | 62-143827 | 9/1987 |
| JP | 9-79285 | 3/1997 |
| JP | H10292831 A | 11/1998 |
| JP | 11159547 A * | 6/1999 |
| JP | 2002-145085 A | 5/2002 |
| WO | WO-2013/073515 A1 | 5/2013 |
| WO | WO-2016/088860 A1 | 6/2016 |

OTHER PUBLICATIONS

International Preliminary Report On Patentability dated Mar. 12, 2020 in corresponding PCT/JP2018/032061.
European Search Report dated Feb. 11, 2021 in corresponding European Application No. 18851854.2.
Japanese Notice of Reasons for Refusal dated Mar. 10, 2021 in corresponding Japanese Application No. 2017-145838.

* cited by examiner

[Fig. 1]
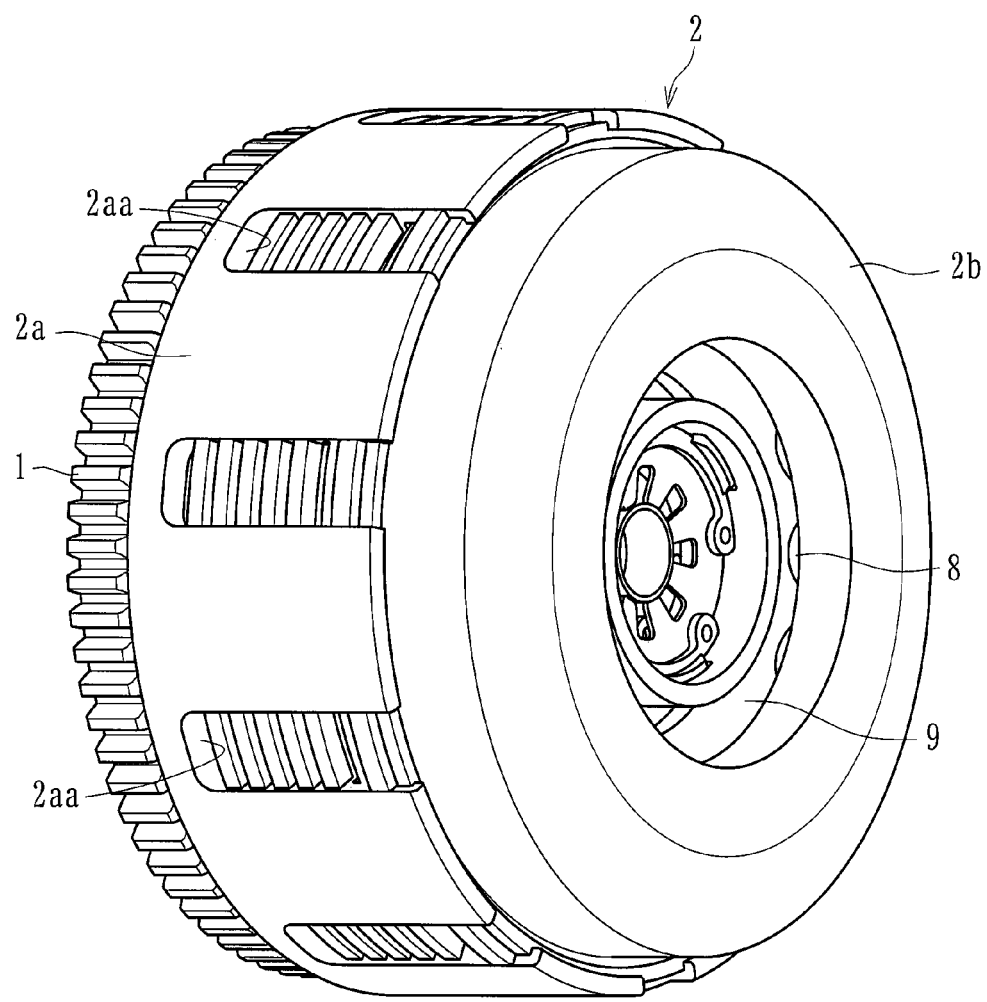

[Fig. 2]
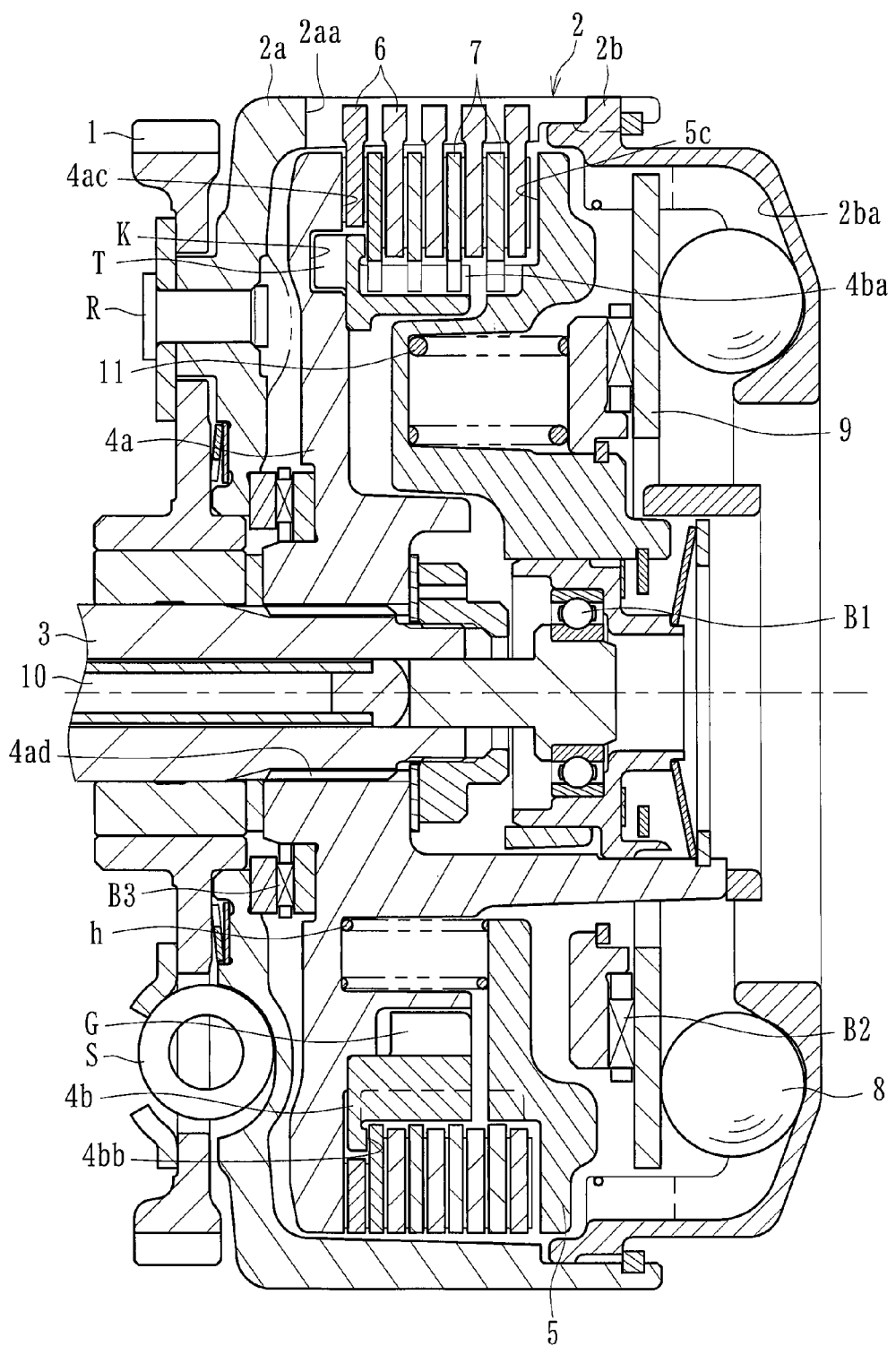

[Fig. 3]
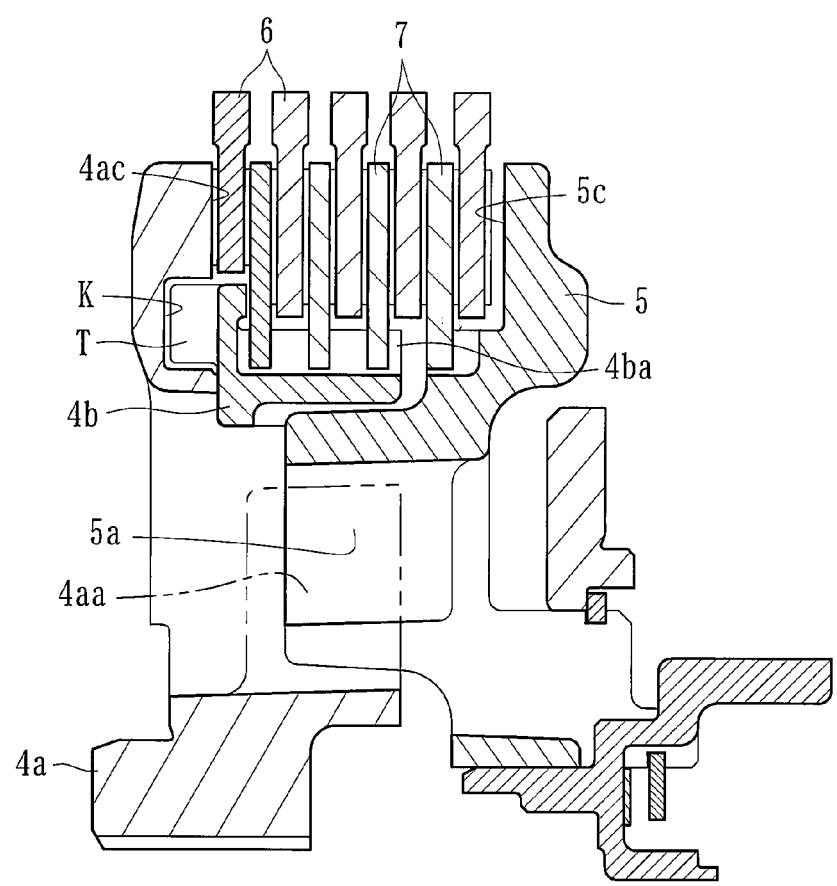

[Fig. 4]
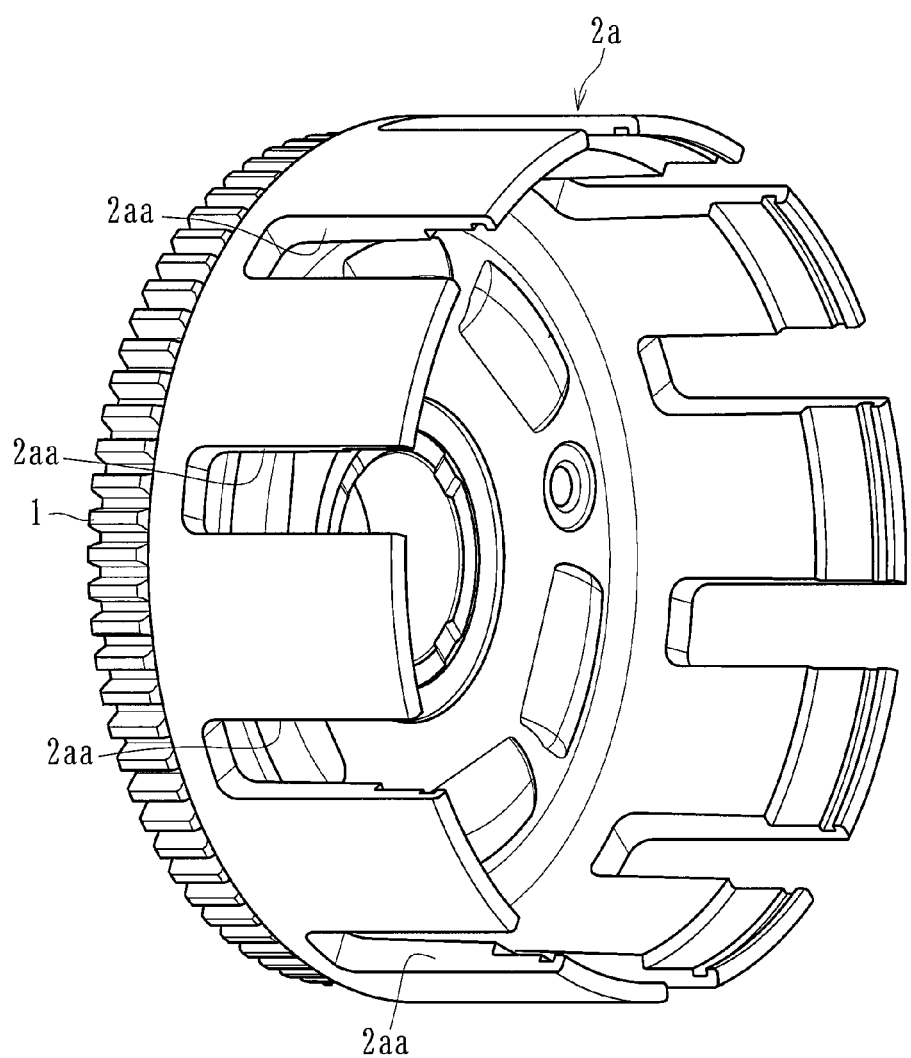

[Fig. 5]
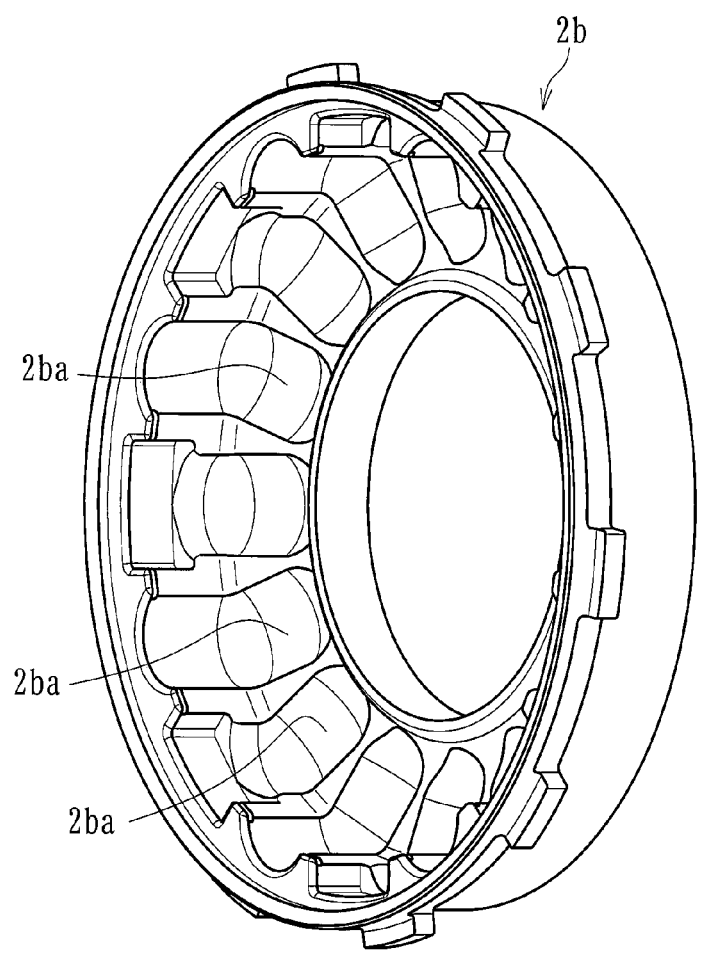

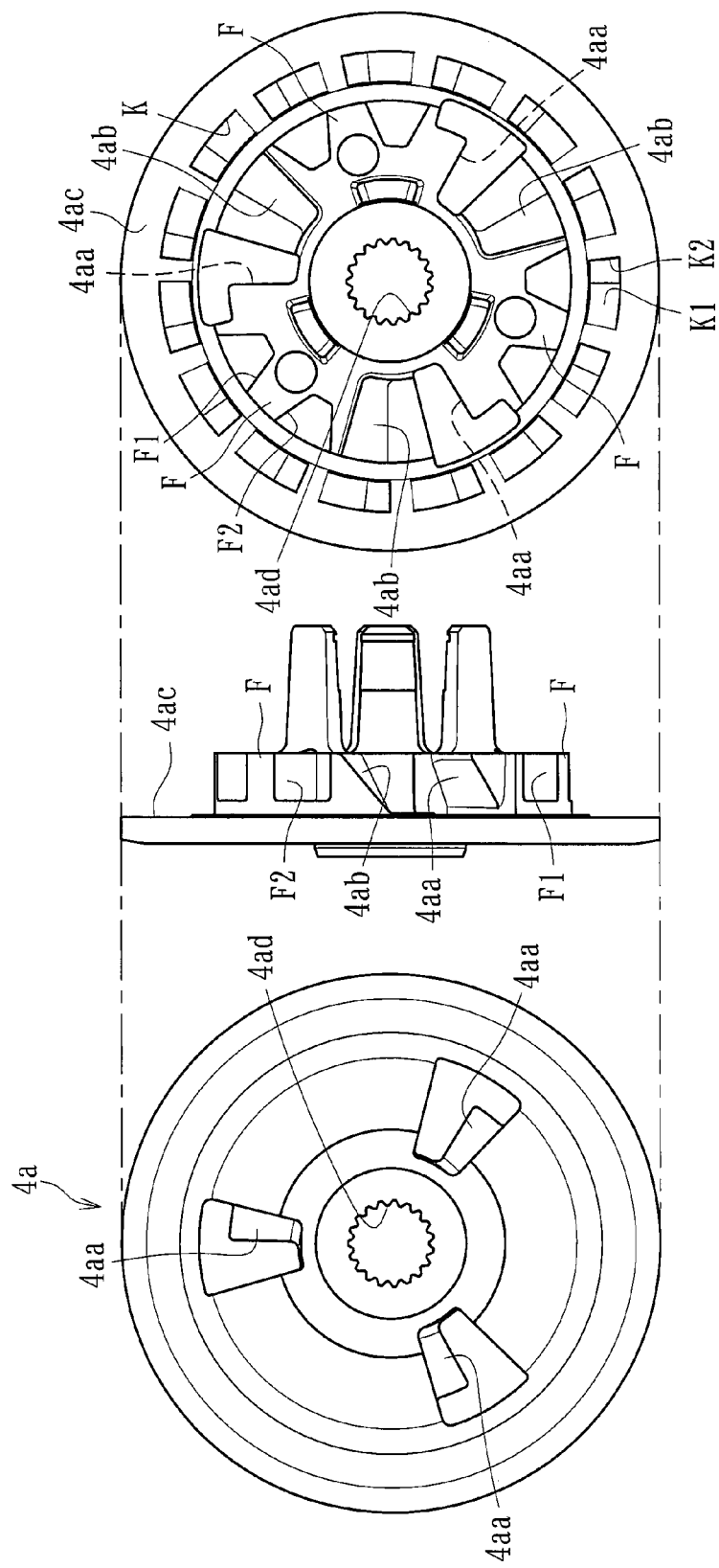
[Fig. 6]

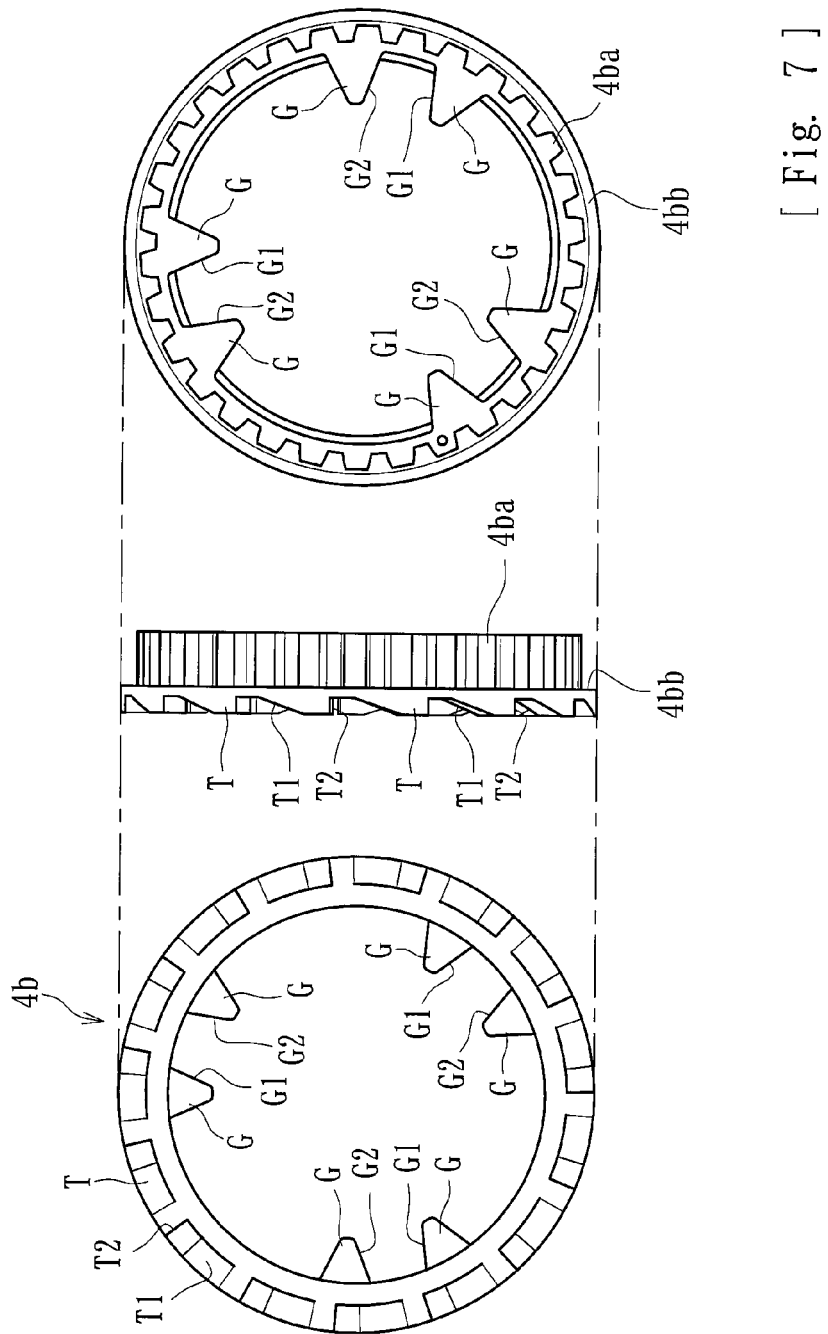
[ Fig. 7 ]

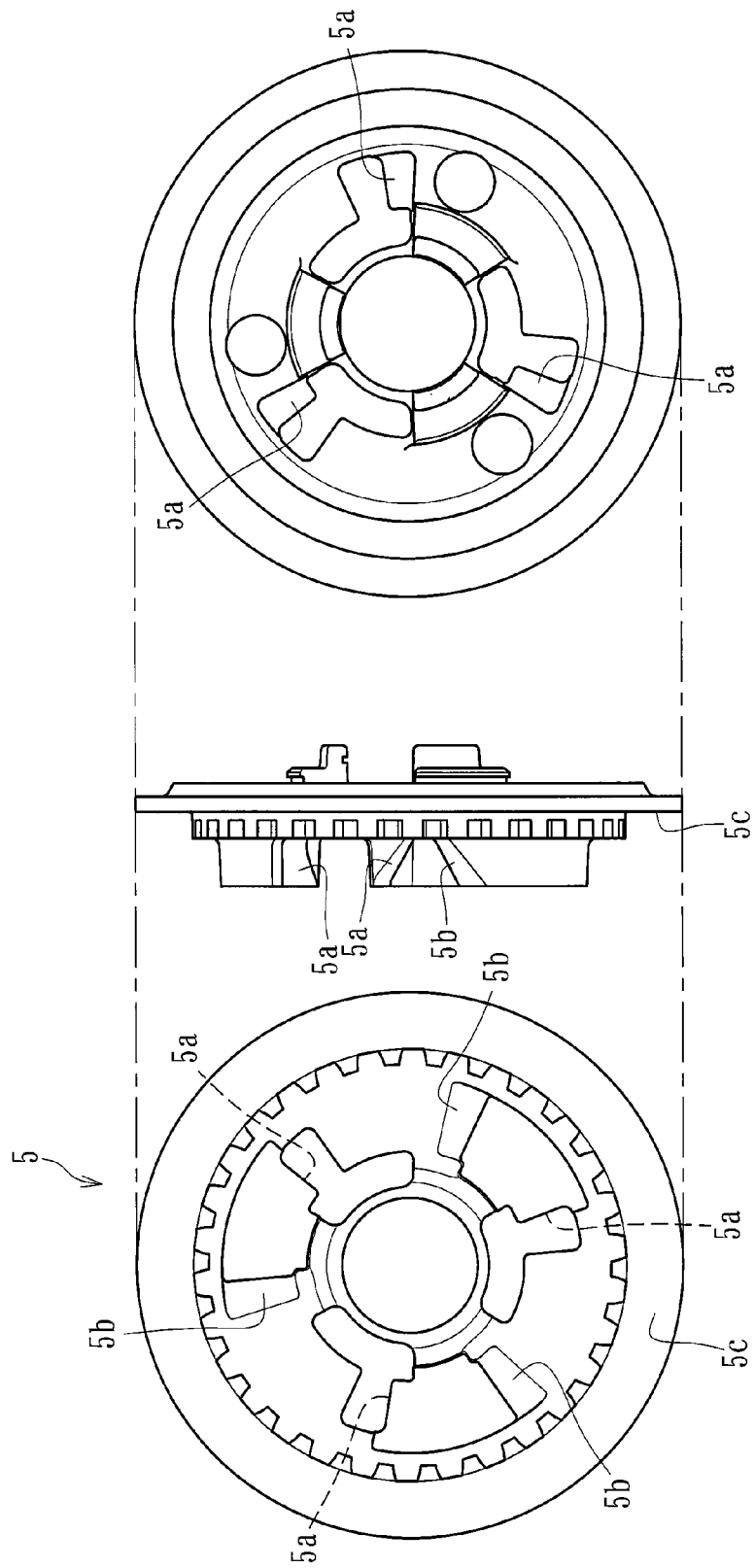

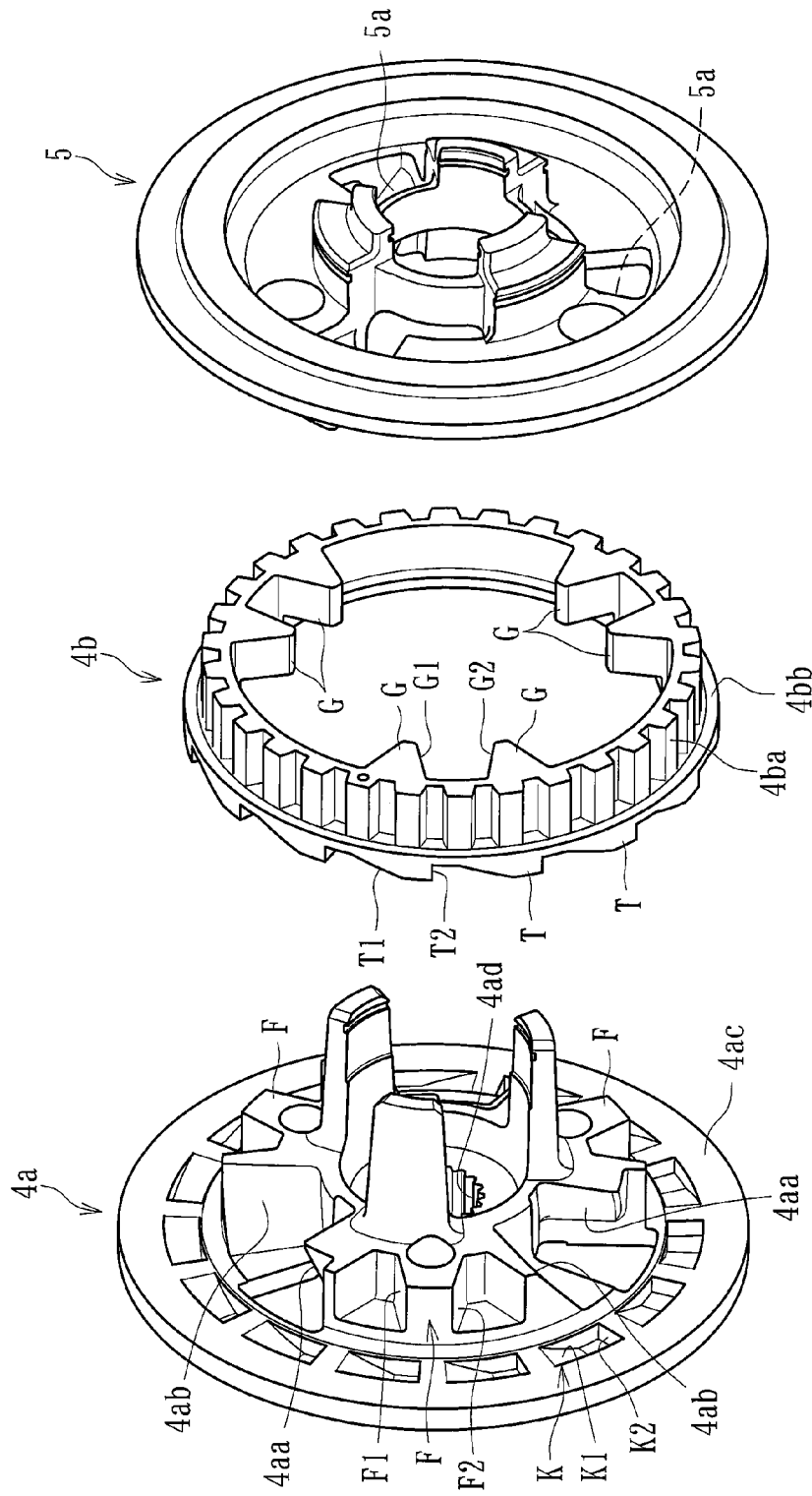
[ Fig. 9 ]

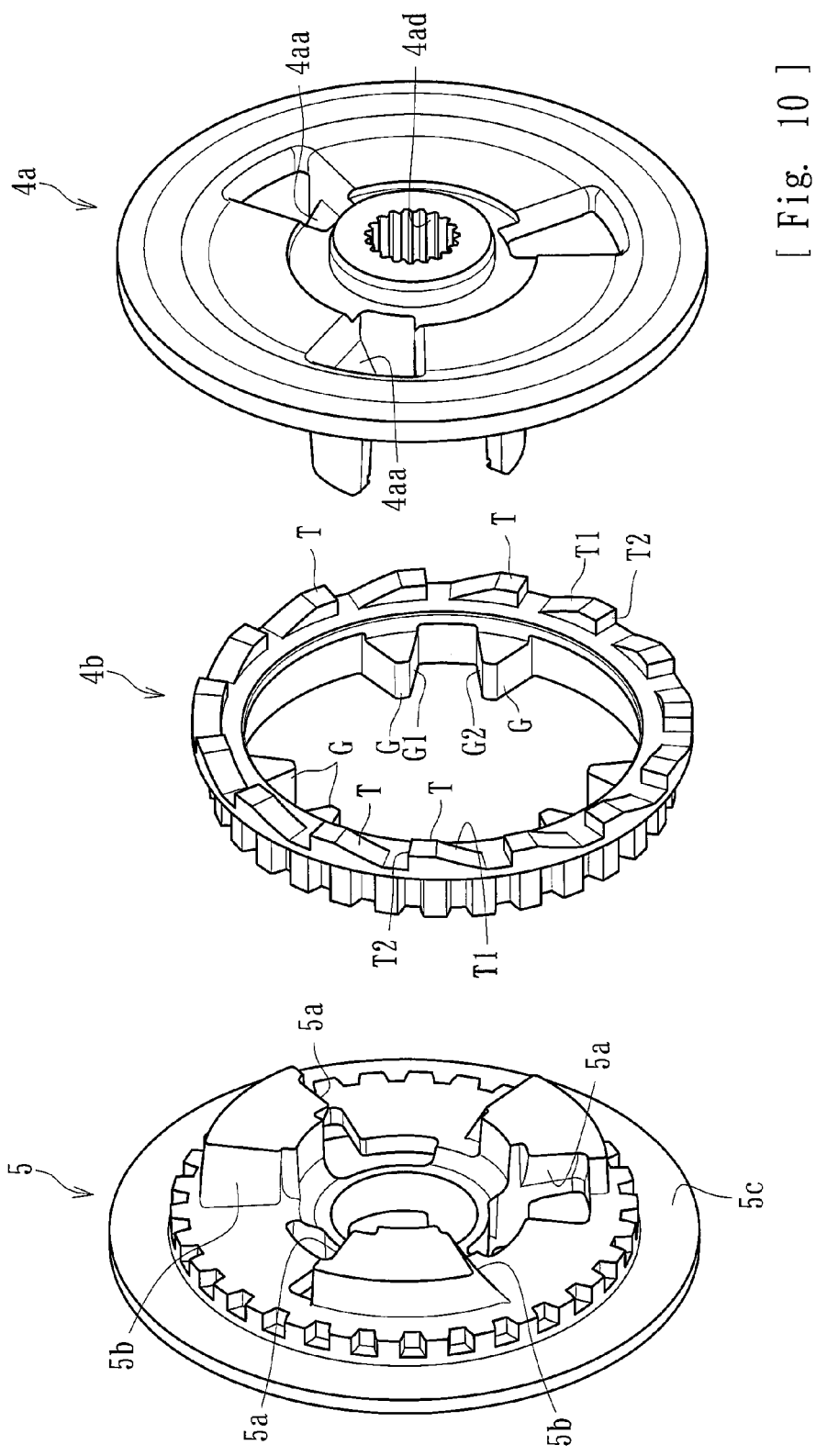

[ Fig. 11 ]
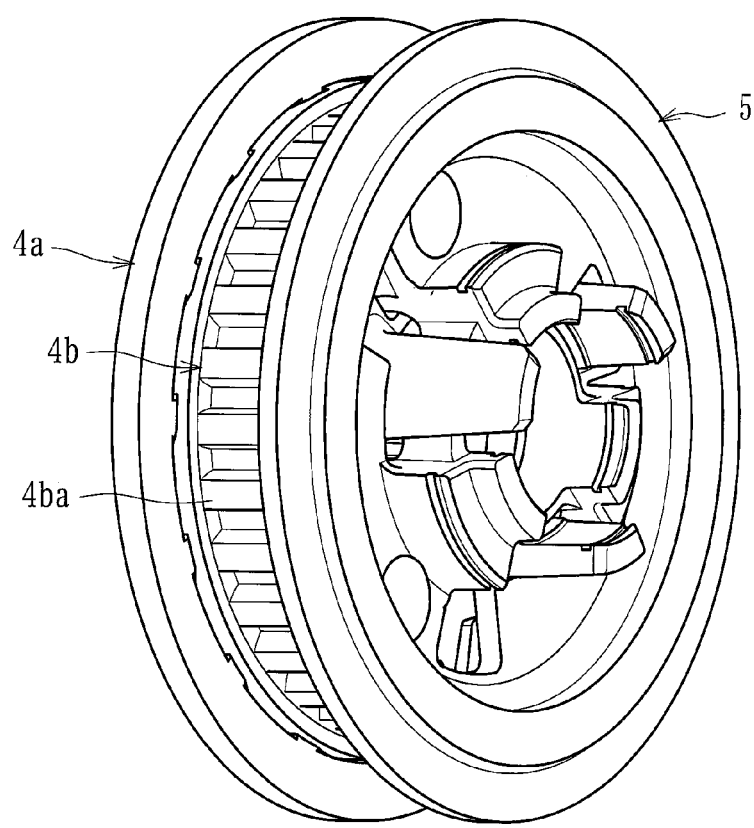

[ Fig. 12 ]
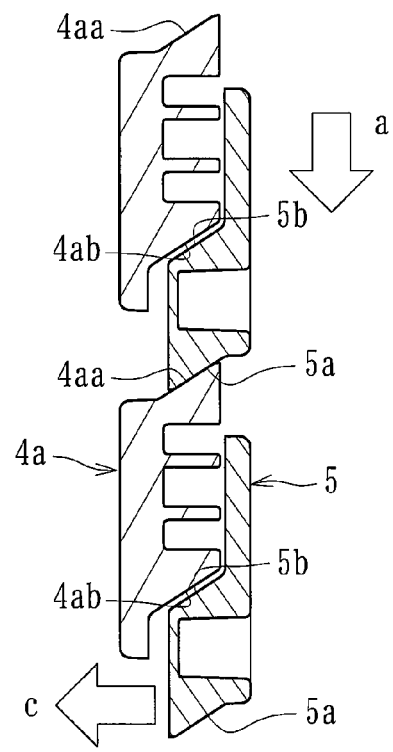
[ Fig. 13 ]
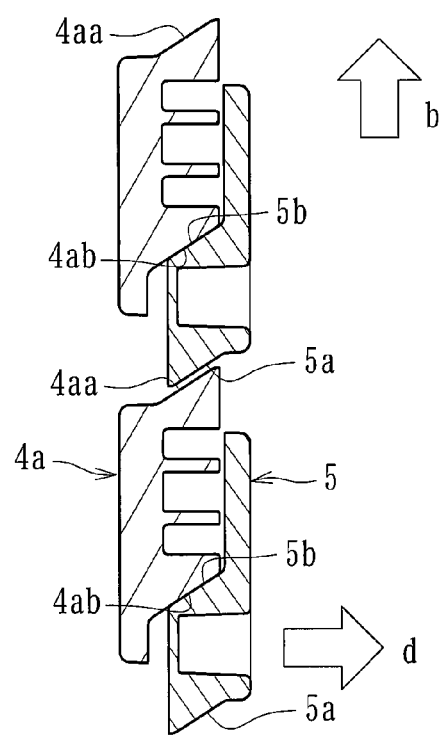

[Fig. 14]
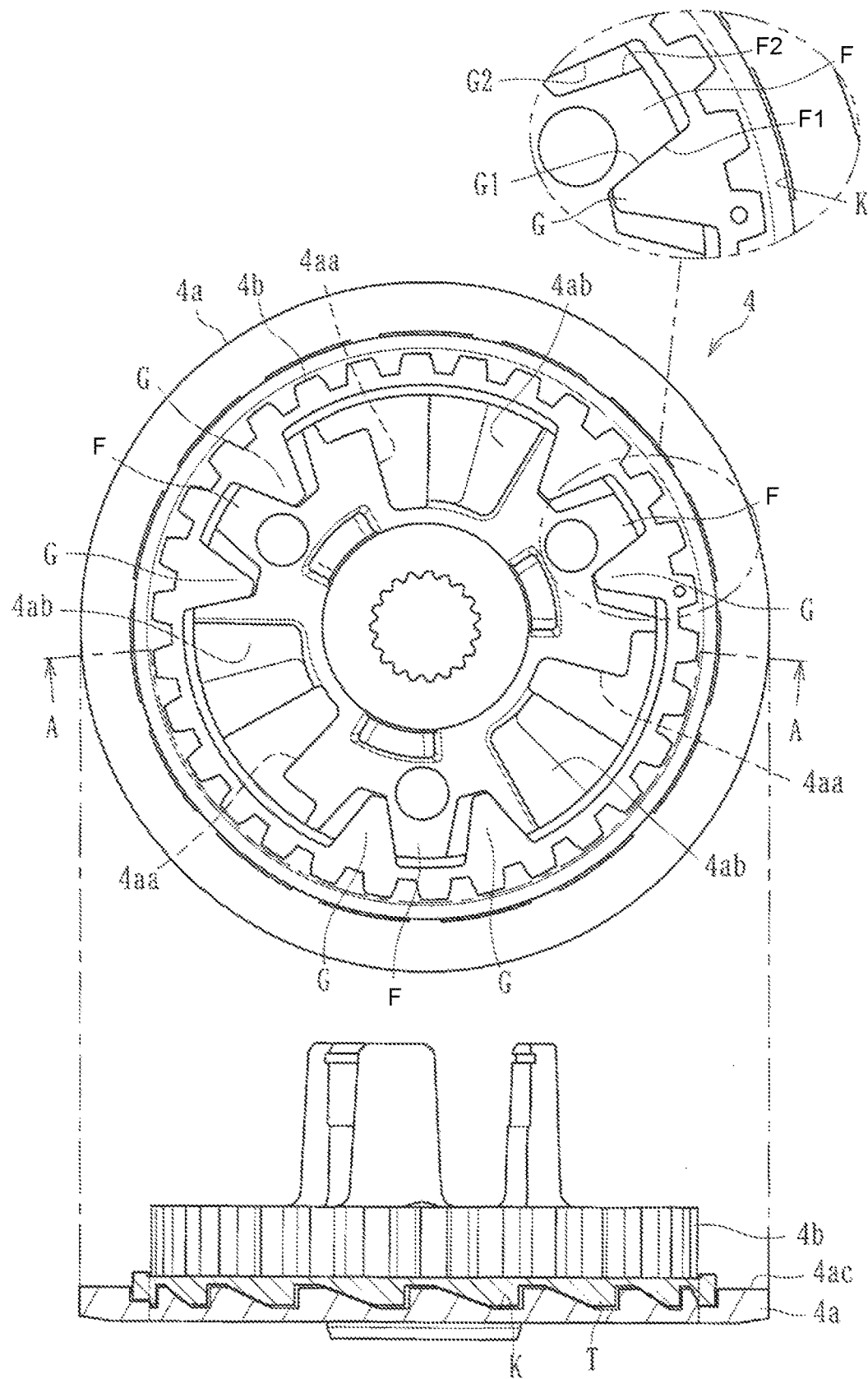

[Fig. 15]
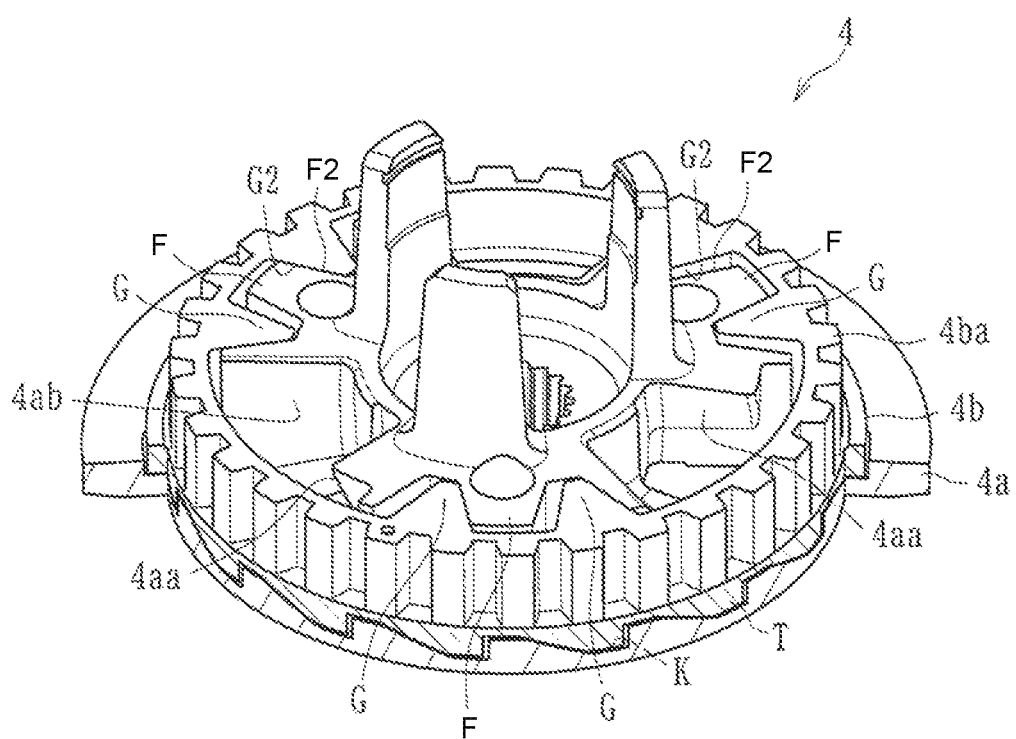

[Fig. 16]
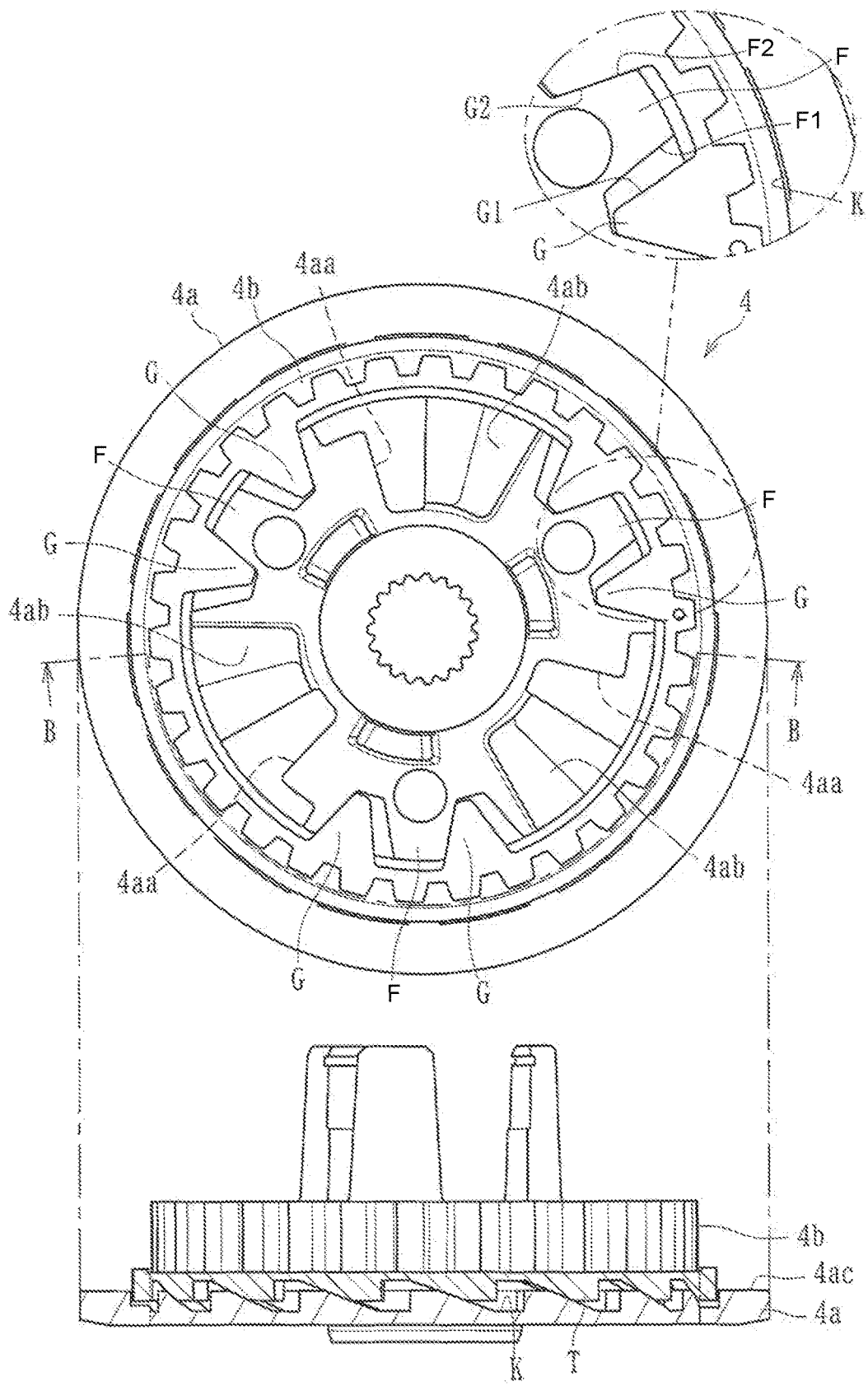

[Fig. 17]
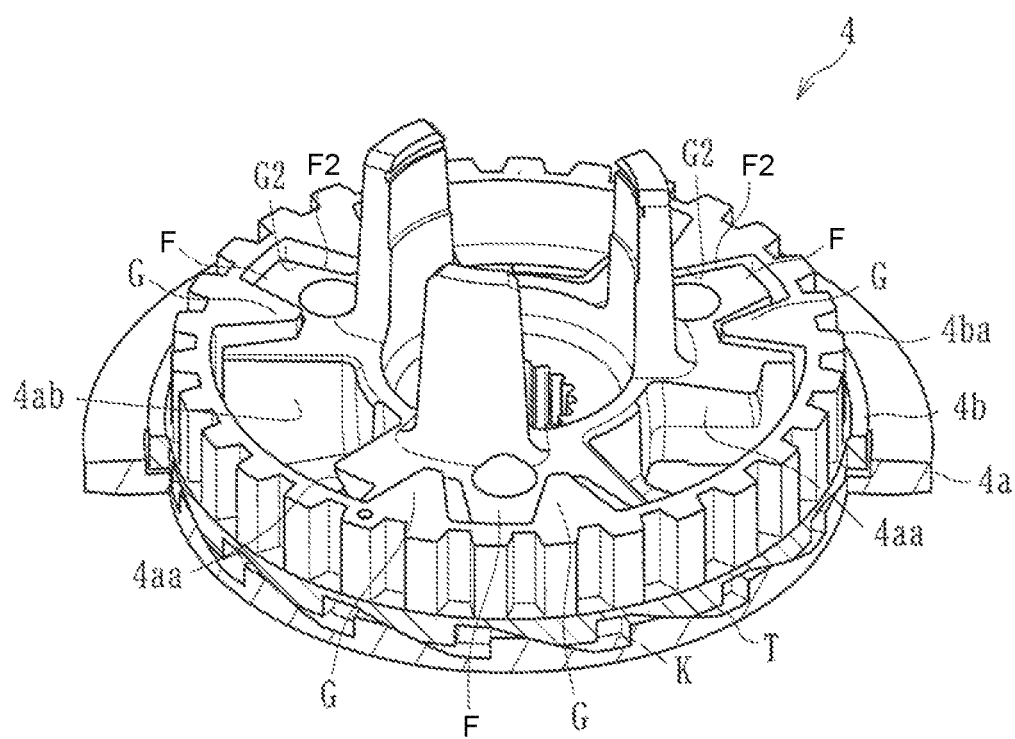

[ Fig. 18 ]
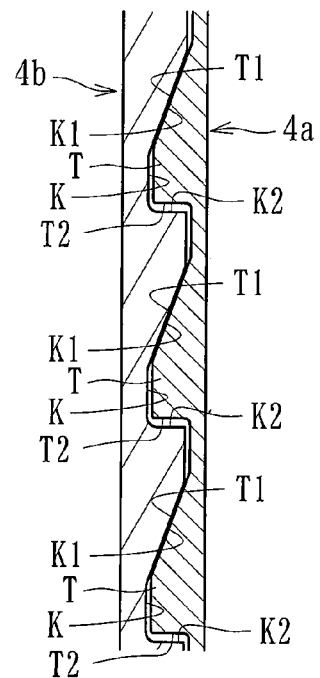
[ Fig. 19 ]
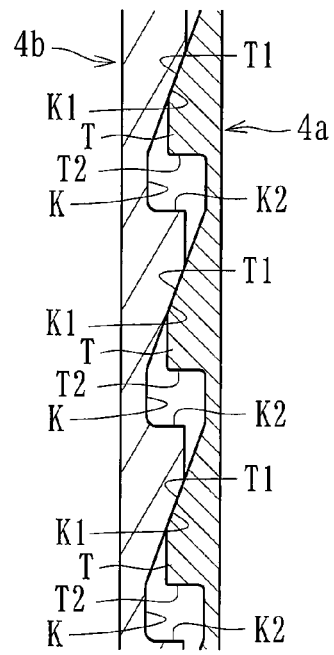

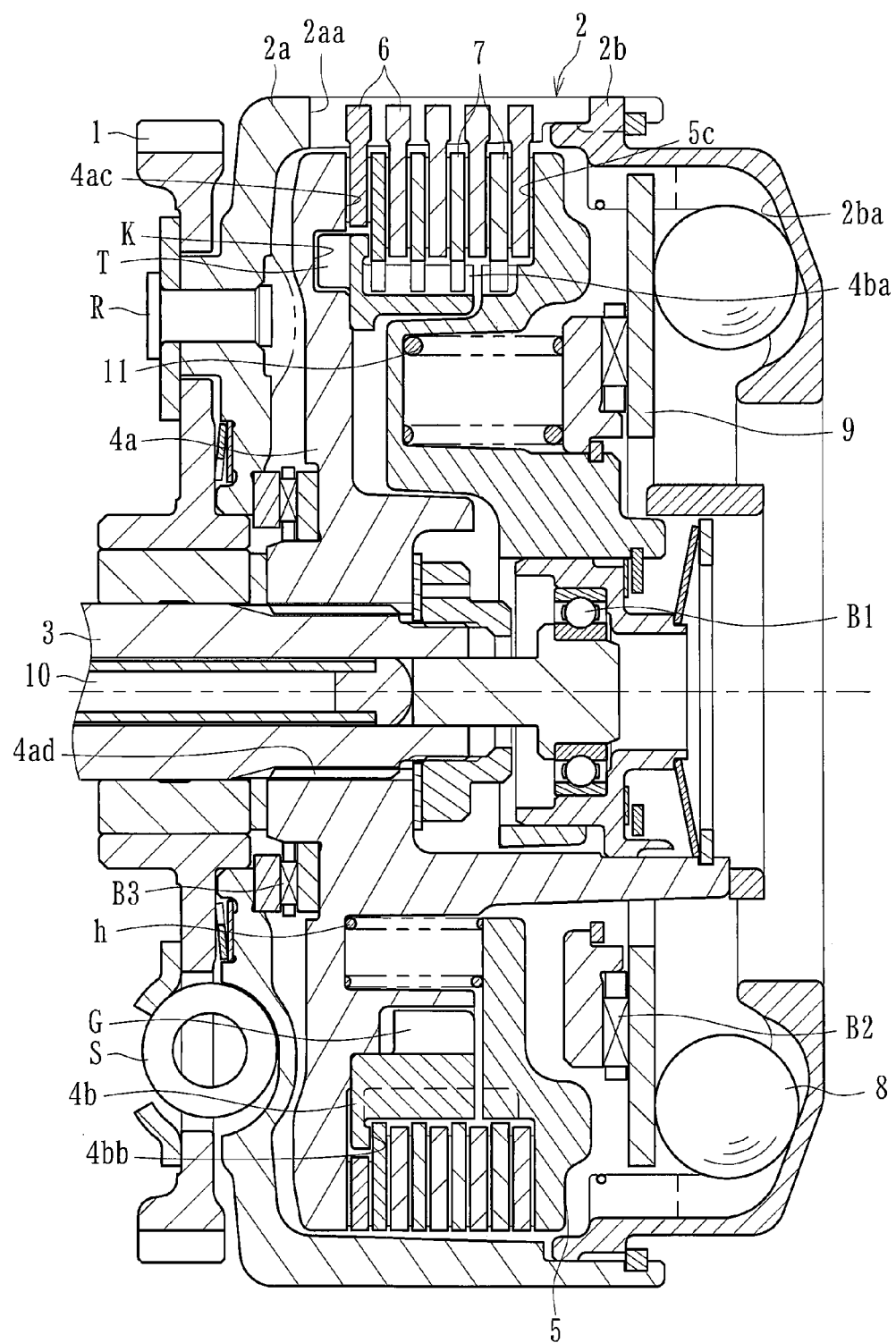
[ Fig. 20 ]

[Fig. 21]
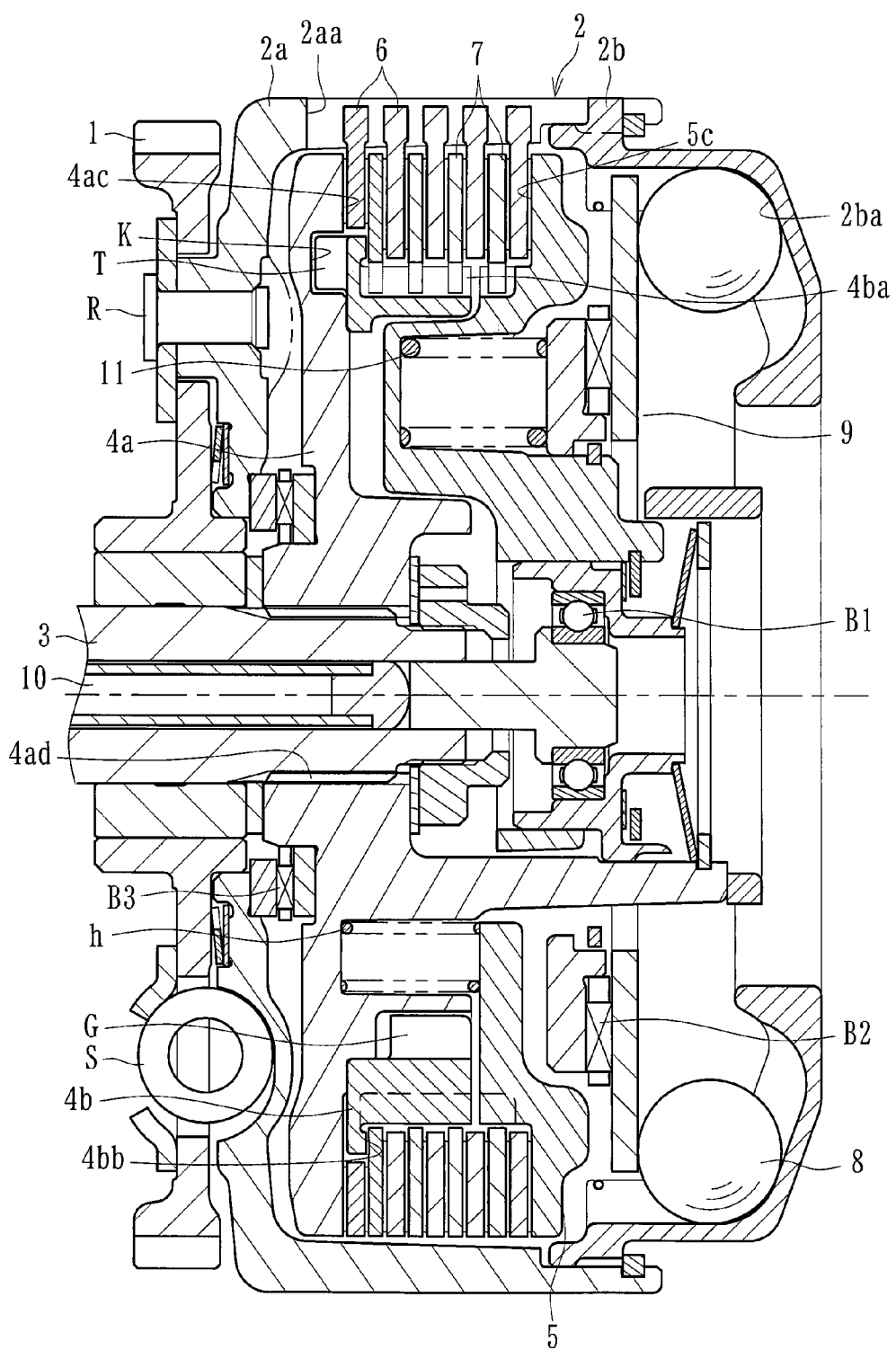

[Fig. 22]
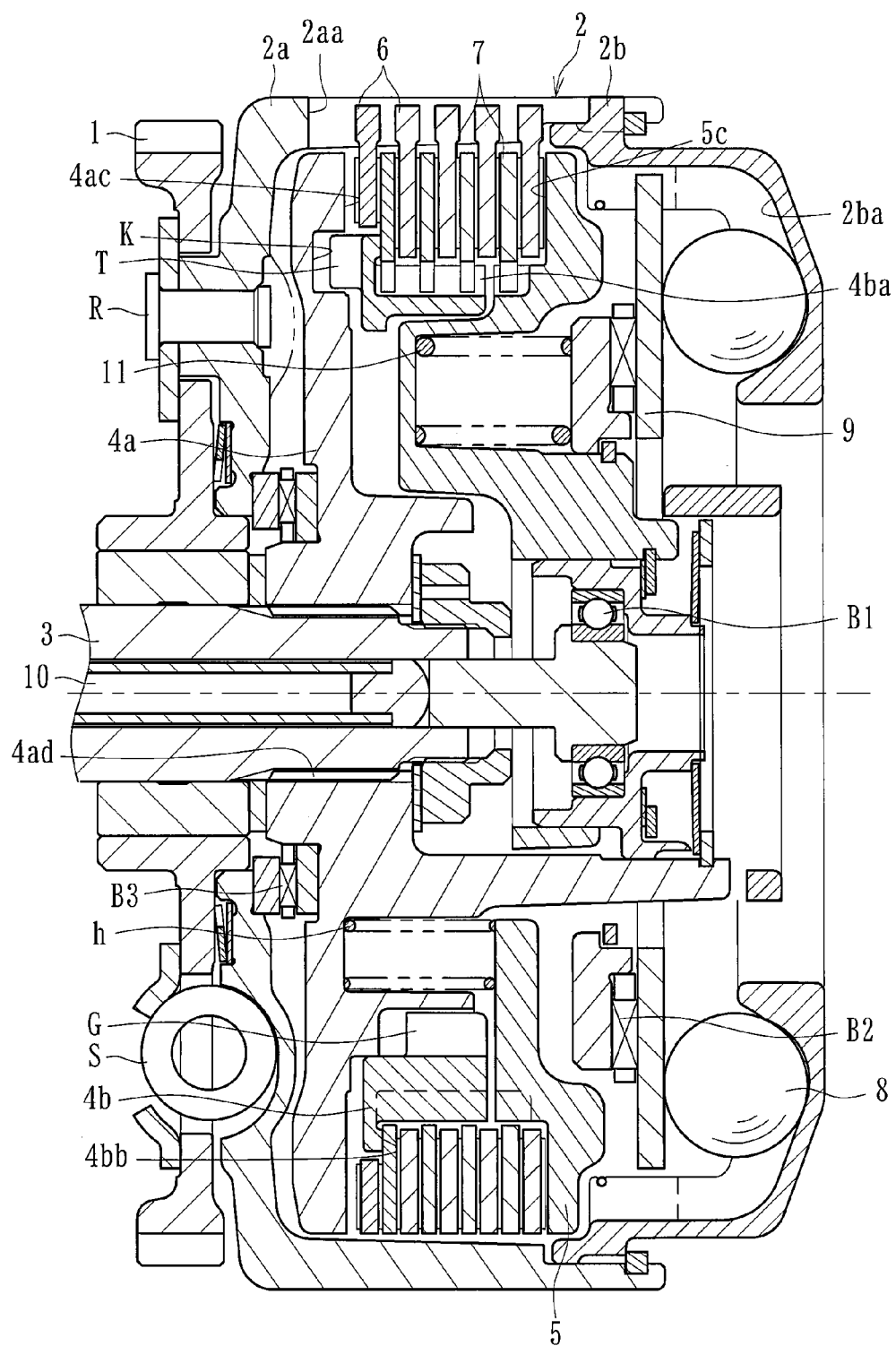

[Fig. 23]
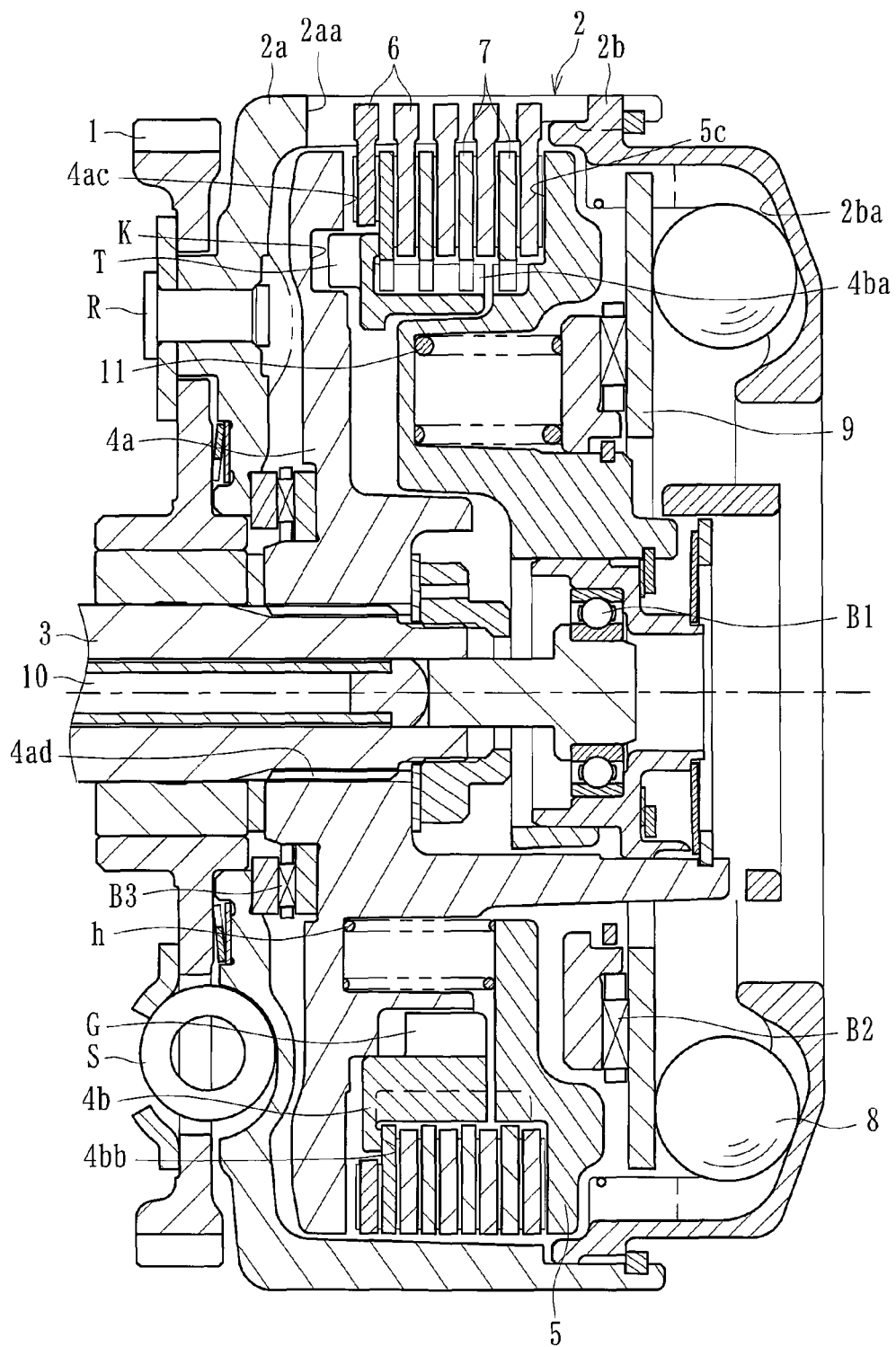

[Fig. 24]
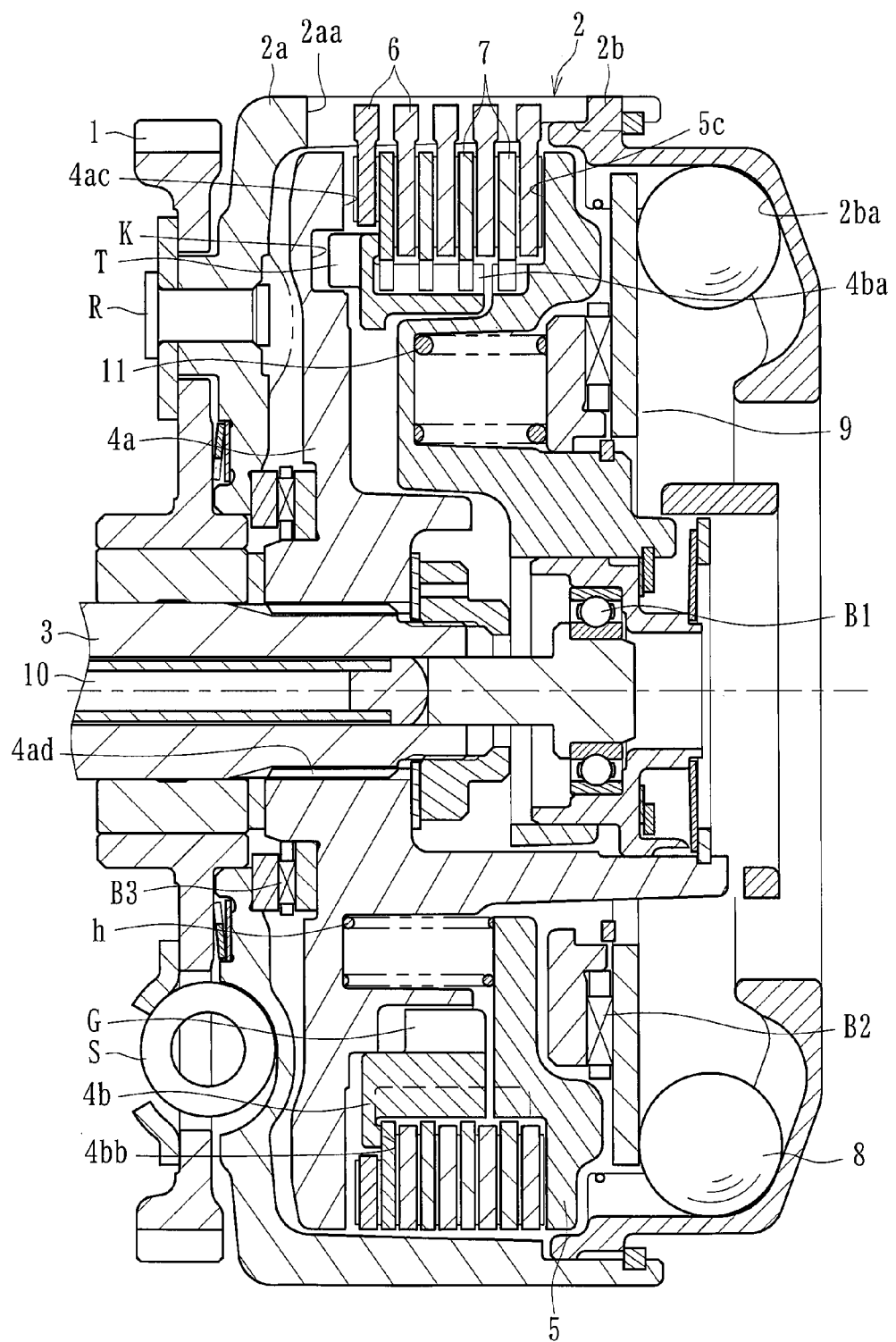

[Fig. 25]
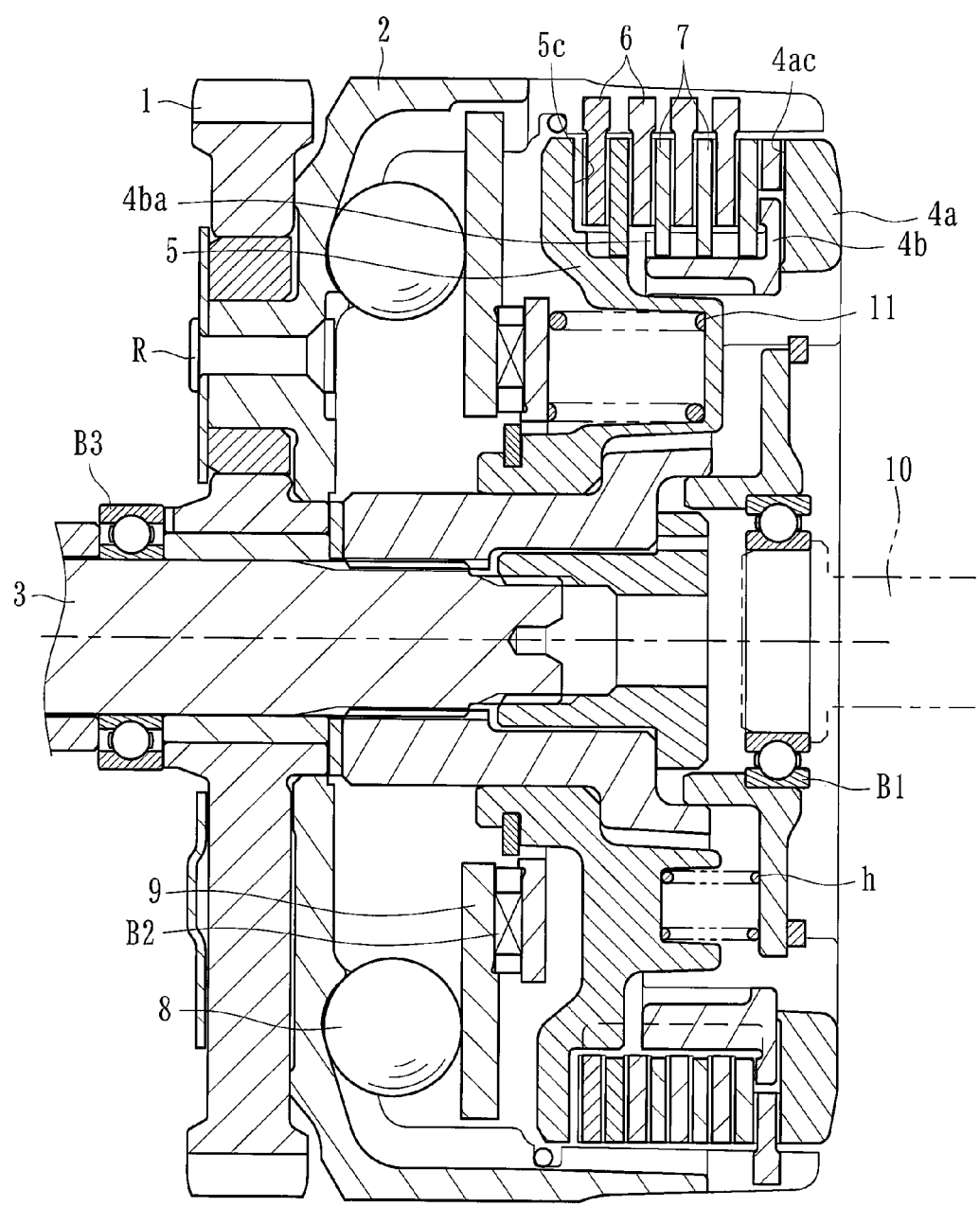

[ Fig. 26 ]
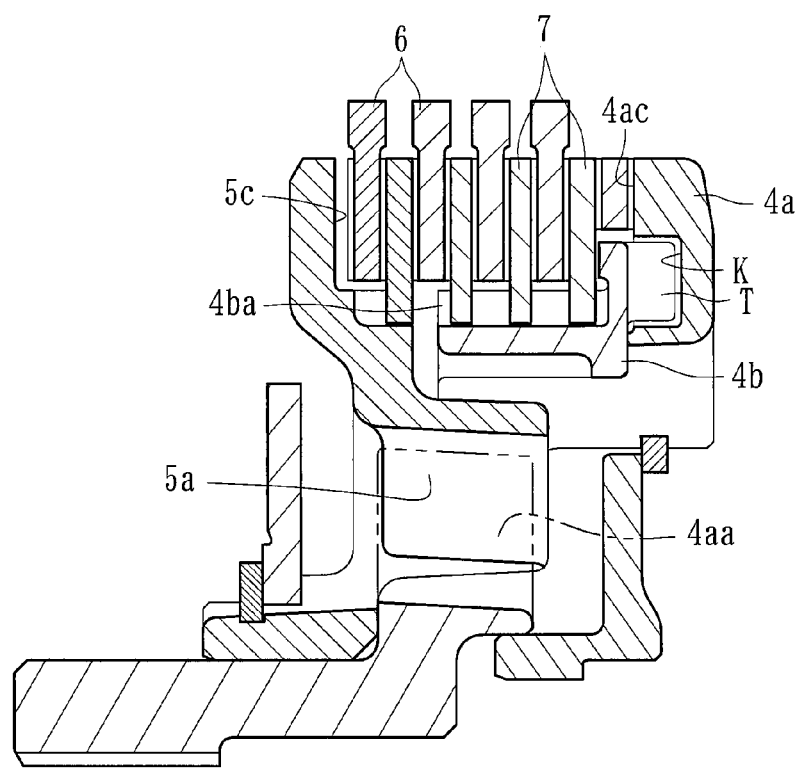

POWER TRANSMISSION DEVICE

CROSS-REFERENCE TO RELATED APPLICATIONS

This application is a continuation of International Application No. PCT/JP2018/032061, filed Aug. 30, 2018, which claims priority to Japanese Application No. 2017-168794, filed Sep. 1, 2017. The disclosures of the above applications are incorporating herein by reference. The present application is being concurrently filed with U.S. application Ser. No. 16/804,032, filed Feb. 28, 2020 entitled "Power Transmission Device", the specification and drawings of which is herein incorporated by reference.

FIELD

The present disclosure relates to a power transmission device that enables and blocks transmission of a rotational force of an input member to an output member as desired.

BACKGROUND

In general, a power transmission device of a two-wheeled vehicle allows and blocks transmission of a drive force of an engine to a transmission and a driving wheel as desired. It has an input member coupled to the side of the engine. An output member is coupled to the side of the transmission and the driving wheel. A clutch member is coupled to the output member. A pressure member is movable closer to and away from the clutch member. The power transmission device is configured to allow transmission of power with driving clutch plates and driven clutch plates brought into press contact with each other by bringing the pressure member into proximity to the clutch member. In order to block the transmission of power, the press-contact force between the driving clutch plates and the driven clutch plates is released by moving the pressure member away from the clutch member.

Japanese Unexamined Utility Model Registration Application Publication No. 62-143827, for example, discloses a power transmission device according to the related art. It includes a weight member (coil spring 16) that can bring the driving clutch plates and driven clutch plates into press contact with each other. This occurs by moving from a radially inner position to a radially outer position of a groove portion using a centrifugal force due to rotation of a clutch housing. With such a power transmission device according to the related art, a centrifugal force can be applied to the weight member when the clutch housing rotates along with the drive of an engine. A drive force of the engine can be transmitted to a wheel by bringing the driving clutch plates and the driven clutch plates into press contact with each other.

The power transmission device according to the related art described above has a cam mechanism with a long hole 32 and a pin 30. A pressing flange 28 can be moved toward the driving clutch plates and the driven clutch plates by moving a clutch hub 13 in the axial direction while rotating the clutch hub 13 using the cam. The cam is composed of the long hole 32 and the pin 30. Thus, the weight member is located at the radially inner position, which brings the clutch plates into press contact with each other to apply engine brake.

In the power transmission device according to the related art described above, in order to apply engine brake, power on the side of the wheel can be transmitted to the side of the engine by engaging a clutch. This brings the driving clutch plates and the driven clutch plates into press contact with each other using the cam mechanism that is composed of the long hole 32 and the pin 30. However, the clutch hub 13 is moved in the direction away from the weight member. Therefore, the weight member cannot be held at a constant position, which may make the subsequent actuation using the weight member unstable.

The present disclosure has been made in view of the foregoing. The present disclosure provides a power transmission device that can apply engine brake by transmitting a rotational force on the side of a wheel to the side of an engine by bringing driving clutch plates and driven clutch plates into press contact with each other when a pressure member is located at a non-actuation position. This can make actuation using a weight member stable when engine brake is applied.

SUMMARY

According to the disclosure, a power transmission device comprises a clutch housing that is rotatable together with an input member. The input member is rotatable by a drive force of an engine of a vehicle. A plurality of driving clutch plates are attached to the clutch housing. A clutch member is coupled to an output member that can rotate a wheel of the vehicle. A plurality of driven clutch plates, attached to the clutch member, are alternately positioned with the driving clutch plates of the clutch housing. A pressure member is movable between an actuation position and a non-actuation portion. In the actuation position, the drive force of the engine can be transmitted to the wheel with the driving clutch plates and the driven clutch plates brought into press contact with each other. In the non-actuation position, transmission of the drive force of the engine to the wheel can be blocked by releasing a press-contact force between the driving clutch plates and the driven clutch plates. A weight member is disposed in a groove portion provided in the clutch housing. The groove portion extends in a radial direction. The weight member is movable, by a centrifugal force due to rotation of the clutch housing, from a radially inner position to a radially outer position of the groove portion. An interlocking member can move the pressure member from the non-actuation position to the actuation position as the weight member is moved from the radially inner position to the radially outer position. The clutch member includes a first clutch member coupled to the output member. A second clutch member is attached to the driven clutch plates. A back torque transmission cam can bring the driving clutch plates and the driven clutch plates into press contact with each other by moving the second clutch member when the pressure member is located at the non-actuation position. A rotational force is input to the first clutch member, via the output member. The back torque transmission cam can hold abutment between the interlocking member and the weight member by moving the second clutch member in a direction of being brought into proximity to the interlocking member.

The power transmission device back torque transmission cam is composed of respective cam surfaces formed integrally with the first clutch member and the second clutch member. The cam surfaces are formed on respective mating surfaces of the first clutch member and the second clutch member.

The power transmission device has a plurality of cam surfaces formed along a circular ring shape of the driven clutch plates. They are attached to the second clutch member.

The power transmission device includes a press-contact assist cam. The press-contact assist cam includes a gradient surface, formed on the first clutch member, and a gradient surface, formed on the pressure member, facing each other. The press-contact assist cam increases the press-contact force between the driving clutch plates and the driven clutch plates when a rotational force input to the input member is transmitted to the output member.

The power transmission device includes a back torque limiter cam. The back torque limiter cam includes a gradient surface, formed on the first clutch member, and a gradient surface, formed on the pressure member, facing each other. The back torque limiter cam releases the press-contact force between the driving clutch plates and the driven clutch plates when the clutch member and the pressure member are rotated relative to each other. Here, rotation of the output member exceeds a rotational speed of the input member. The back torque transmission cam is configured to be actuated before actuation of the back torque limiter cam.

The back torque transmission cam can hold abutment between the interlocking member and the weight member by moving the second clutch member in the direction of being brought into proximity to the interlocking member. Thus, engine brake can be applied by transmitting the rotational force on the side of the wheel to the side of the engine by bringing the driving clutch plates and the driven clutch plates into press contact with each other when the pressure member is located at the non-actuation position. Thus, actuation using the weight member can be performed stably when engine brake is applied.

The back torque transmission cam comprises respective cam surfaces formed integrally with the first clutch member and the second clutch member. The cam surfaces are formed on respective mating surfaces of the first clutch member and the second clutch member. Thus, the second clutch member can be moved reliably and smoothly by the back torque transmission cam.

A plurality of cam surfaces are formed along a circular ring shape of the driven clutch plates. The driven clutch plates are attached to the second clutch member. Thus, a generally uniform pressing force can be applied to the driven clutch plates by the action of the back torque transmission cam. This can bring the driving clutch plates and the driven clutch plates into press contact with each other more efficiently.

A press-contact assist cam includes the gradient surface, formed on the first clutch member, and the gradient surface, formed on the pressure member, facing each other. The press-contact assist cam increases the press-contact force between the driving clutch plates and the driven clutch plates when the rotational force, input to the input member, is transmitted to the output member. Thus, the press-contact force due to the press-contact assist cam can be applied in addition to the press-contact force due to movement of the weight member due to a centrifugal force. This brings the driving clutch plates and the driven clutch plates into press contact with each other more smoothly and reliably.

A back torque limiter cam includes the gradient surface, formed on the first clutch member, and the gradient surface, formed on the pressure member, facing each other. The back torque limiter cam can release the press-contact force between the driving clutch plates and the driven clutch plates when the clutch member and the pressure member are rotated relative to each other. Here, rotation of the output member exceeds the rotational speed of the input member. Thus, transmission of excessive power to the side of the engine, via the input member, can be avoided when the weight member is located at the radially outer position. The back torque transmission cam is actuated before actuation of the back torque limiter cam. This allows actuation using the back torque transmission cam to be performed reliably.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a power transmission.

FIG. 2 is a vertical sectional view of FIG. 1.

FIG. 3 is an enlarged cross-section view of a press-contact assist cam of the power transmission device.

FIG. 4 is a perspective view of a housing portion of a clutch housing of the power transmission device.

FIG. 5 is a perspective view of a cover portion of the clutch housing of the power transmission device.

FIG. 6 is a front plan, side elevation and rear plan view of a first clutch member of the power transmission device.

FIG. 7 is a front plan, side elevation and rear plan view of a second clutch member of the power transmission device.

FIG. 8 is a front plan, side elevation and rear plan view of a pressure member of the power transmission device.

FIG. 9 is a perspective view of a state before assembly in a first direction of the first clutch member, the second clutch member, and the pressure member of the power transmission device.

FIG. 10 is a perspective view of a state before assembly in a second direction of the first clutch member, the second clutch member, and the pressure member of the power transmission device.

FIG. 11 is a perspective view of a state after assembly of the first clutch member, the second clutch member, and the pressure member of the power transmission device.

FIG. 12 is a cross-section view of the action of the press-contact assist cam of the power transmission device.

FIG. 13 is a cross-section view of the action of a back torque limiter cam of the power transmission device.

FIG. 14 is a plan, side elevation and partially in section exploded view of the first clutch member and the second clutch member of the power transmission device assembled together.

FIG. 15 is a perspective partially in section view of the first clutch member and the second clutch member of the power transmission device assembled together.

FIG. 16 is a plan, side elevation and partially in section exploded view of the first clutch member and the second clutch member of the power transmission device assembled together.

FIG. 17 is a perspective view in section view of the first clutch member and the second clutch member of the power transmission device assembled together.

FIG. 18 is a cross-section view of the action of a back torque transmission cam of the power transmission device, illustrating a state before the back torque transmission cam is actuated.

FIG. 19 is a cross-section view of the action of the back torque transmission cam of the power transmission device, illustrating a state after the back torque transmission cam is actuated.

FIG. 20 is a cross-section view of the power transmission device with a weight member located between a radially inner position and a radially outer position and with the back torque transmission cam located at a non-actuation position.

FIG. 21 is a cross-section view of the power transmission device with the weight member located at the radially outer position and with the back torque transmission cam located at the non-actuation position.

FIG. 22 is a cross-section view of the power transmission device with the weight member located at the radially inner position and with the back torque transmission cam located at the actuation position.

FIG. 23 is a cross-section view of the power transmission device with the weight member located between the radially inner position and the radially outer position and with the back torque transmission cam located at an actuation position.

FIG. 24 is a cross-section view of the power transmission device with the weight member located at the radially outer position and with the back torque transmission cam located at the actuation position.

FIG. 25 is a cross-section section view of a power transmission device according to a different embodiment of the present disclosure.

FIG. 26 is an enlarged sectional view illustrating the internal configuration of the power transmission device.

DETAILED DESCRIPTION

Embodiments of the present disclosure will be specifically described below while referring to the drawings.

A power transmission device according to the present embodiment is disposed in a vehicle, such as a two-wheeled vehicle, to enable and block transmission of a drive force of an engine to the side of a transmission and a driving wheel.

As illustrated in FIGS. 1 to 19, the power transmission device includes a clutch housing 2 formed with an input gear 1 (input member). The input gear 1 is rotatable by the drive force of the engine of the vehicle. A clutch member, first clutch member 4a and second clutch member 4b, is illustrated. A pressure member 5 is illustrated in FIG. 2, attached on the right side of the clutch members, first clutch member 4a and second clutch member 4b. A plurality of driving clutch plates 6 are attached to the housing 2. A plurality of driven clutch plates 7 are attached to the clutch member. A weight member 8, formed from a steel ball member, is movable (rollable) in the radial direction in the clutch housing 2. The weight member 8 rests on an interlocking member 9. An actuation member 10 can be actuated by a manual operation or an actuator (not illustrated). In the drawings, reference symbol S denotes a spring damper, B1 denotes a roller bearing, and B2 and B3 each denote a thrust bearing.

The input gear 1 is rotatable about an output shaft 3 when a drive force (rotational force) transmitted from the engine. The input gear 1 is coupled to the clutch housing 2 by a rivet R etc. The clutch housing 2 is configured to have a housing portion 2a formed from a cylindrical member that opens on the right end side in FIG. 2. The housing portion 2a is coupled to the input gear 1. A cover portion 2b is attached so as to cover the opening of the housing portion 2a. The clutch housing 2 is rotatable along with rotation of the input gear 1 by the drive force of the engine.

As illustrated in FIG. 4, the housing portion 2a, of the clutch housing 2, is formed with a plurality of notches 2aa in the circumferential direction. The plurality of driving clutch plates 6 are attached and fit with the notches 2aa. Each of such driving clutch plates 6 is formed from a plate material formed in a generally circular ring shape. The plates 6 are configured to be rotatable along with rotation of the clutch housing 2 and are slidable in the axial direction (right-left direction in FIG. 2).

Further, as illustrated in FIG. 5, the cover portion 2b, of the clutch housing 2, is formed with a plurality of groove portions 2ba provided in the bottom surface of the cover portion 2b. The groove portions 2ba extend in the radial direction of the cover portion 2b. A weight member 8 is disposed in each of the groove portions 2ba. When the clutch housing 2 is stationary, the engine is stationary or idling and or rotating at a low speed. Thus, the weight members 8 are located at the radially inner position, the position indicated in FIG. 2. When the clutch housing 2 is rotating at a high speed, the weight members 8 are located at the radially outer position, the position indicated in FIG. 21.

The clutch member, first clutch member 4a and second clutch member 4b, have the plurality of driven clutch plates 7. The driven clutch plates are formed alternately with the driving clutch plates 6 of the clutch housing 2. The driven clutch plates 7 are coupled to the output shaft 3 (output member) that can rotate the wheel of the vehicle. The clutch member is an assembly of two members together, the first clutch member 4a and the second clutch member 4b.

As illustrated in FIG. 6, the first clutch member 4a is formed from a circular plate member. A flange surface 4ac is formed over the peripheral edge portion. The output shaft 3 is inserted through an insertion hole 4ad (see FIGS. 2 and 6) formed in the center of the first clutch member 4a. Splines formed on the output shaft 3 and the first clutch member 4a are meshed with each other so that the output shaft 3 and the first clutch member 4a are coupled to each other in the rotational direction. As illustrated in FIGS. 6, 9, and 10, the first clutch member 4a is formed with gradient surfaces 4aa. This constitutes a press-contact assist cam. Gradient surfaces 4ab constitute a back torque limiter cam.

As illustrated in FIG. 7, the second clutch member 4b is formed from a circular ring member. The driven clutch plates 7 are attached through spline fitting to a spline fitting portion 4ba (see FIGS. 2 and 7). The spline fitting portion 4ba is formed on the outer peripheral surface of the second clutch member 4b. As illustrated in FIG. 9 to 11, the pressure member 5 is assembled to the clutch member, first clutch member 4a and second clutch member 4b. The plurality of driving clutch plates 6 and driven clutch plates 7 are stacked alternately between a flange surface 5c (see FIGS. 2 and 8) of the pressure member 5 and the flange surface 4ac (see FIGS. 2 and 6) of the clutch member 4a.

As illustrated in FIG. 8, the pressure member 5 is formed from a circular plate member. The flange surface 5c is formed over the peripheral edge portion. The pressure member 5 is movable between an actuation position (see FIG. 21) and a non-actuation position (FIG. 2). In the actuation position, the driving clutch plates 6 and the driven clutch plates 7 are brought into press contact with each other to enable transmission of the drive force of the engine to the wheel. In the non-actuation position, the press-contact force is released between the driving clutch plates 6 and the driven clutch plates 7 to block transmission of the drive force of the engine to the wheel.

More specifically, as illustrated in FIGS. 7, 9, and 10, the spline fitting portion 4ba, formed on the second clutch member 4b, includes a recessed and projecting shape integrally formed generally over the entire circumference of the outer peripheral side surface of the second clutch member 4b. With the driven clutch plates 7 fit in recessed grooves, the spline fitting portion 4ba, movement of the driven clutch plates 7 in the rotational direction is regulated while allowing movement of the driven clutch plates 7 with respect to the second clutch member 4b in the axial direction. This allows rotation of the driven clutch plates 7 together with the second clutch member 4b.

The driven clutch plates 7 are formed and alternately stacked with the driving clutch plates 6. Thus, the adjacent clutch plates 6 and 7 can be brought into press contact with each other. The press-contact force therebetween can be released. That is, the clutch plates 6 and 7 are allowed to slide in the axial direction of the second clutch member 4b. The pressure member 5 is moved leftward in FIG. 2. The flange surface 5c of the pressure member 5 and the flange surface 4ac of the clutch member 4 are brought into proximity to each other. The clutch plates 6 and 7 are brought into press contact with each other. The rotational force of the clutch housing 2 is transmitted to the output shaft 3, via the second clutch member 4b and the first clutch member 4a.

The pressure member 5 is moved rightward in FIG. 2. The flange surface 5c of the pressure member 5 and the flange surface 4ac of the first clutch member 4a are moved away from each other. The press-contact force between the clutch plates 6 and 7 is released. The rotational force is not transmitted to the output shaft 3. Thus, the first clutch member 4a and the second clutch member 4b do not follow rotation of the clutch housing 2.

Thus, the rotational force, the drive force of the engine, that is input to the clutch housing 2 is transmitted to the side of the wheel via the output shaft 3 (output member) when the driving clutch plates 6 and the driven clutch plates 7 are brought into press contact with each other. Also, transmission of the rotational force, the drive force of the engine, that is input to the clutch housing 2 to the output shaft 3, output member, can be blocked when the press contact is released between the driving clutch plates 6 and the driven clutch plates 7.

Further, in the present embodiment, as illustrated in FIGS. 3, 6, 8, 9, and 10, the first clutch member 4a is formed with the gradient surfaces 4aa and 4ab. The pressure member 5 is formed with gradient surfaces 5a and 5b. These surfaces 5a, 5b face the gradient surfaces 4aa and 4ab, respectively. The gradient surfaces 4aa and the gradient surfaces 5a abut against each other to form a press-contact assist cam. The gradient surface 4ab and the gradient surface 5b abut against each other to form a back torque limiter cam.

When the rotational speed of the engine is raised to establish a state where a rotational force input to the input gear 1 and the clutch housing 2 is transmitted to the output shaft 3, via the first clutch member 4a and the second clutch member 4b and with the weight members 8 at the radially outer position, a rotational force in the direction a is applied to the pressure member 5 as illustrated in FIG. 12. Therefore, a force in the direction c, in the drawing, is generated for the pressure member 5 by the action of the press-contact assist cam. Consequently, the pressure member 5 is moved in the direction (leftward in FIG. 2). Here, the flange surface 5c is further brought into proximity to the flange surface 4ac of the first clutch member 4a. This increases the press-contact force between the driving clutch plates 6 and the driven clutch plates 7.

When rotation of the output shaft 3 exceeds the rotational speed of the input gear 1 and the clutch housing 2 during travel of the vehicle, it generate back torque in the direction b in FIG. 13. The pressure member 5 is moved in the direction d, in the drawing, by the action of the back torque limiter cam. This releases the press-contact force between the driving clutch plates 6 and the driven clutch plates 7. Consequently, this avoids trouble of the power transmission device or a power source (engine side) due to back torque.

The weight members 8 are disposed in the groove portions 2ba provided in the clutch housing 2. In the present embodiment, the grooves are in the cover portion 2b. The groove portions 2ba extend in the radial direction. The weight members 8 bring the driving clutch plates 6 and the driven clutch plates 7 into press contact with each other. The weight members 8 move from the radially inner position (see FIG. 2) to the radially outer position (see FIG. 21) of the groove portions 2ba. This is due to a centrifugal force due to rotation of the clutch housing 2. The rolling surfaces (bottom surfaces) of the groove portions 2ba, for the weight members 8, are sloped upward from the radially inner position toward the radially outer position. When the clutch housing 2 is stationary, the weight members 8 are held at the radially inner position by the biasing force of a spring h. When the clutch housing 2 is rotated, the weight members 8 are moved along the upward slope by a centrifugal force applied to the weight members 8 (see FIG. 20). The weight members 8 move to the radially outer position (see FIG. 21) when the clutch housing 2 reaches a predetermined rotational speed.

The spring h is deflected until the separation distance between the driving clutch plates 6 and the driven clutch plates 7 becomes zero. Thereafter, a clutch spring 11 is deflected to bring the driving clutch plates 6 and the driven clutch plates 7 into press contact with each other. During shifting, the spring h is expanded and the clutch spring 11 is contracted to move the pressure member 5.

The interlocking member 9 is formed from a circular ring member disposed in cover portion 2b of the clutch housing 2. The interlocking member 9 fits with the groove portions that are formed in the inner peripheral surface of the cover portion 2b. The interlocking member 9 couples with the clutch housing 2 so as to be rotatable together with the clutch housing 2 and movable in the right-left direction in FIG. 2. The interlocking member 9 is configured to move leftward in FIG. 2 against the biasing force of the clutch spring 11. This occurs with movement of the weight members 8 from the radially inner position to the radially outer position. This, in turn, moves the pressure member 5 from the non-actuation position to the actuation position by pressing the pressure member 5.

The clutch spring 11 is formed from a coil spring interposed between the interlocking member 9 and the pressure member 5. The springs 11 enable movement of the pressure member 5 in the direction to bring the driving clutch plates 6 and the driven clutch plates 7 into press contact with each other. This occurs by pressing the pressure member 5 along with movement of the interlocking member 9. The springs 11 can absorb the pressing force of the pressure member 5 against the interlocking member 9 during actuation of the actuation member 10.

That is, when the weight members 8 are moved from the radially inner position to the radially outer position, along with rotation of the clutch housing 2, and the interlocking member 9 pressed by the weight members 8, the pressing force is transmitted to the pressure member 5 via the clutch spring 11. As illustrated in FIGS. 20 and 21, the pressure member 5 is moved leftward in the drawings to bring the driving clutch plates 6 and the driven clutch plates 7 into press contact with each other. Actuation of the actuation member 10 in that state causes the pressure member 5 to move rightward in the drawings by the pressing force of the actuation member 10. However, the pressing force against the interlocking member 9 is absorbed by the clutch spring 11 to hold the position of the interlocking member 9 and positions of the weight members 8.

The actuation member 10 is formed from a member (see FIG. 2) that is operable manually or by an actuator. The actuation member 10 can move the pressure member 5 in the direction (rightward in FIG. 2) to release the press-contact force between the driving clutch plates 6 and the driven clutch plates 7. The actuation member 10 can be moved rightward in FIG. 2 by an operation on a clutch pedal, a clutch lever, etc. of the vehicle or actuation of an actuator, for example, to abut against the pressure member 5. This disengages the clutch (block power transmission) by releasing the press-contact force between the driving clutch plates 6 and the driven clutch plates 7 by moving the pressure member 5 in the same direction.

Here, the power transmission device, according to the present embodiment, has a back torque transmission cam (cam surfaces K1 and T1). This can bring the driving clutch plates 6 and the driven clutch plates 7 into press contact with each other. This occurs by moving the second clutch member 4b when a rotational force is input to the first clutch member 4a via the output shaft 3 (output member) when the pressure member 5 is located at the non-actuation position. As illustrated in FIGS. 14 to 17, such a back torque transmission cam includes cam surfaces (K1 and T1) formed integrally with respective mating surfaces (mating surfaces for assembly) of the first clutch member 4a and the second clutch member 4b.

As illustrated in FIGS. 6 and 9, the cam surfaces K1 are formed from a plurality of gradient surfaces formed over the entire circumference on the radially inner side of the flange surface 4ac, the mating surface with the second clutch member 4b, that is formed on the first clutch member 4a. The gradient surfaces are formed on end surfaces, on one side, of a plurality of groove portions K formed in a circular ring shape along the peripheral edge portion of the first clutch member 4a. That is, the first clutch member 4a is formed with the plurality of groove portions K that extend in the circumferential direction. The end surfaces of the groove portions K, on one side, are formed as gradient surfaces to constitute the cam surfaces K1 of the back torque transmission cam as illustrated in FIGS. 18 and 19. As illustrated in the drawings, end surfaces of the groove portions K on the other side are formed as wall surfaces K2 that extend in the axial direction, right-left direction in FIGS. 18 and 19, of the first clutch member 4a.

As illustrated in FIGS. 7 and 10, the cam surfaces T1 are formed from a plurality of gradient surfaces formed over the entire circumference on the bottom surface, the mating surface with the first clutch member 4a, of the second clutch member 4b. The cam surfaces T1 are formed on end surfaces, on one side, of a plurality of projecting portions T formed in a circular ring shape along the bottom surface of the second clutch member 4b. That is, the second clutch member 4b is formed with the plurality of projecting portions T that extend in the circumferential direction. The end surfaces of the projecting portions T on one side are formed as gradient surfaces to constitute the cam surfaces T1 of the back torque transmission cam as illustrated in FIGS. 18 and 19. As illustrated in the drawings, end surfaces of the projecting portions T on the other side are formed as wall surfaces T2. The wall surfaces T2 extend in the axial direction, right-left direction in FIGS. 18 and 19, of the second clutch member 4b.

The first clutch member 4a and the second clutch member 4b are assembled together with the projecting portions T fit into the groove portions K as illustrated in FIGS. 14 and 15. Here, the cam surfaces K1 and the cam surfaces T1 face each other to constitute a back torque transmission cam. The wall surfaces K2 and the wall surfaces T2 face each other with a predetermined distance away from each other as illustrated in FIG. 18. Thus, when the pressure member 5 is located at the non-actuation position and a rotational force is input to the first clutch member 4a via the output shaft 3, the first clutch member 4a is rotated with respect to the second clutch member 4b. Thus, as illustrated in FIGS. 16, 17, and 19, the second clutch member 4b is moved rightward in FIGS. 2 and 19 with respect to the first clutch member 4a by the action of the cam between the cam surfaces K1 and the cam surfaces T1.

On the other hand, as illustrated in FIG. 7, the second clutch member 4b is formed with a pressing portion 4bb on the extension of the spline fitting portion 4ba. When the second clutch member 4b is moved rightward in FIG. 2, the second clutch member 4b presses the leftmost driven clutch plate 7 in the drawing, among the driving clutch plates 6 and the driven clutch plates 7 that are attached and stacked, in the same direction. Consequently, the driving clutch plates 6 and the driven clutch plates 7 can be brought into press contact with each other, even if the pressure member 5 is located at the non-actuation position. Thus, a rotational force input from the output shaft 3 (output member) can be transmitted to the side of the engine to apply engine brake.

In particular, the back torque transmission cam is configured to hold abutment between the interlocking member 9 and the weight members 8 by moving the second clutch member 4b in the direction (rightward in FIG. 2) of being brought into proximity to the interlocking member 9. That is, when the back torque transmission cam is actuated to move the second clutch member 4b rightward in FIG. 2, the driving clutch plates 6 and the driven clutch plates 7 are brought into press contact with each other. The pressure member 5 is pressed in the same direction. Thus, the pressing force is transmitted to the interlocking member 9, via the clutch spring 11, that holds abutment between the interlocking member 9 and the weight members 8.

Thus, due to rotation of the clutch housing 2, if the interlocking member 9 and the weight members 8 are moved away from each other during actuation of the back torque transmission cam, the interlocking member 9 occasionally cannot follow movement of the weight members 8 between the radially inner position and the radially outer position. With the present embodiment, meanwhile, abutment between the interlocking member 9 and the weight members 8 can be held even during actuation of the back torque transmission cam. The interlocking member 9 can be caused to stably follow movement of the weight members 8.

Further, a plurality of cam surfaces K1 and T1, that constitute the back torque transmission cam according to the present embodiment, are formed along the circular ring shape where the driven clutch plates 7 attached to the second clutch member 4b. That is, the cam surfaces K1 and T1 are formed along the projection shape (circular ring shape) that are pressed by the pressing portion 4bb when the back torque transmission cam is actuated. Consequently, the pressing portion 4bb can apply a generally uniform pressing force to the driven clutch plates 7 by the action of the back torque transmission cam. This can bring the driving clutch plates 6 and the driven clutch plates 7 into press contact with each other more efficiently.

Furthermore, the back torque transmission cam, including the cam surfaces K1 and the cam surfaces T1, is configured to be actuated before actuation of the back torque limiter cam, including the gradient surfaces 4ab and the gradient surfaces 5b. That is, the back torque transmission cam can be actuated before actuation of the back torque limiter cam. The clearance (dimension of a gap) between the cam surfaces K1 and the cam surfaces T1 is set to be smaller than the clearance (dimension of a gap) between the gradient surfaces 4ab and the gradient surfaces 5b.

Here, the power transmission device, according to the present embodiment, includes a torque transmission portion formed on each of the first clutch member 4a and the second clutch member 4b to transmit a rotational force transmitted to the second clutch member 4b to the first clutch member 4a not via the back torque transmission cam (cam surfaces K1 and cam surfaces T1). A movement amount restriction portion, formed on each of the first clutch member 4a and the second clutch member 4b, restricts the amount of movement of the second clutch member 4b due to the back torque transmission cam (cam surfaces K1 and cam surfaces T1).

That is, a plurality of (three in the present embodiment) projections F are formed integrally with the first clutch member 4a at equal intervals in the circumferential direction as illustrated in FIGS. 6 and 9. Projecting portions G are formed integrally with the second clutch member 4b to extend inward as illustrated in FIGS. 7 and 9. When the first clutch member 4a and the second clutch member 4b are assembled together, each projection F is interposed between two projecting portions G as illustrated in FIGS. 14 to 17. One side surface F1 of the projection F and an abutment surface (first abutment surface G1) of one of the projecting portions G face each other. The other side surface F2 of the projection F and an abutment surface (second abutment surface G2) of the other projecting portion G face each other.

Thus, the one side surface F1 of the projection F, formed on the first clutch member 4a, and the first abutment surface G1 of the one projecting portion G, formed on the second clutch member 4b, constitute the torque transmission portion. That is, when the clutch is engaged (to transmit a drive force) by bringing the driving clutch plates 6 and the driven clutch plates 7 into press contact with each other, with the pressure member 5 moved to the actuation position, the wall surfaces K2 of the groove portions K and the wall surfaces T2 of the projecting portions T of the back torque transmission cam are held away from each other (see FIG. 18). The one side surface F1 of the projection F and the first abutment surface G1 of the projecting portion G abut against each other as illustrated in FIGS. 14 and 15. This allows reception and transmission of a rotational force of the second clutch member 4b to the first clutch member 4a.

Meanwhile, the other side surface F2 of the projection F, formed on the first clutch member 4a, and the second abutment surface G2 of the other projecting portion G, formed on the second clutch member 4b, constitute the movement amount restriction portion according to the present embodiment. That is, when the pressure member 5 is located at the non-actuation position and a rotational force is input to the first clutch member 4a, via the output shaft 3, the first clutch member 4a and the second clutch member 4b are rotated relative to each other. Thus, the second clutch member 4b is moved by the action of the cam between the cam surfaces K1 of the groove portions K and the cam surfaces T1 of the projecting portions T of the back torque transmission cam (see FIG. 19). When the amount of movement reaches a set value, the other side surface F2 of the projection F and the second abutment surface G2 of the projecting portion G abut against each other as illustrated in FIGS. 16 and 17. Thus, relative rotation of the second clutch member 4b with respect to the first clutch member 4a is regulated. Thus, the amount of movement of the second clutch member 4b at the time when the back torque transmission cam is actuated can be restricted.

In the present embodiment, the projection F is formed on the first clutch member 4a. The projecting portion G is formed on the second clutch member 4b. Instead, however, the projecting portion G may be formed on the first clutch member 4a, and the projection F may be formed on the second clutch member 4b. In this case, the one side surface F1 of the projection F, formed on the second clutch member 4b, and the first abutment surface G1 of the one projecting portion G, formed on the first clutch member 4a, constitute the torque transmission portion according to the present embodiment. The other side surface F2 of the projection F, formed on the second clutch member 4b, and the second abutment surface G2 of the other projecting portion G, formed on the first clutch member 4a, constitute the movement amount restriction portion according to the present embodiment.

Next, the action of the back torque transmission cam according to the present embodiment will be described.

When the engine is stationary or idling or the rotational speed of the input gear 1 is low, the drive force of the engine is not transmitted to the input gear 1. Therefore, as illustrated in FIG. 2, the weight members 8 are located at the radially inner position. Also, the pressure member 5 is located at the non-actuation position. At this time, when a rotational force is input to the first clutch member 4a via the output shaft 3 (output member), as illustrated in FIG. 22, the second clutch member 4b is moved rightward in the drawing by the action of the back torque transmission cam. The driving clutch plates 6 and the driven clutch plates 7 are brought into press contact with each other to transmit the rotational force to the side of the engine.

When the vehicle starts after the vehicle is stationary or idling, the rotational speed of the input gear 1 transitions from a low speed to a high speed (middle speed range). Therefore, as illustrated in FIG. 21, the weight members 8 are located between the radially inner position and the radially outer position, and the pressure member 5 is located between the non-actuation position and the actuation position. At this time, when a rotational force is input to the first clutch member 4a, via the output shaft 3 (output member), with the clutch operated by the actuation member 10 and with the pressure member 5 located at the non-actuation position, as illustrated in FIG. 23, the second clutch member 4b is moved rightward in the drawing by the action of the back torque transmission cam. The driving clutch plates 6 and the driven clutch plates 7 are brought into press contact with each other to transmit a rotational force to the side of the engine.

When the vehicle accelerates and travels in a high speed range after starting, the rotational speed of the input gear 1 is high. Therefore, as illustrated in FIG. 21, the weight members 8 are located at the radially outer position. The pressure member 5 is located at the actuation position. At this time, when a rotational force is input to the first clutch member 4a, via the output shaft 3 (output member), with the clutch operated by the actuation member 10 and with the pressure member 5 located at the non-actuation position, as illustrated in FIG. 24, the second clutch member 4b is moved rightward in the drawing by the action of the back torque transmission cam. The driving clutch plates 6 and the driven clutch plates 7 are brought into press contact with each other to transmit a rotational force to the side of the engine.

With the embodiment described above, the back torque transmission cam can hold abutment between the interlocking member 9 and the weight members 8 by moving the second clutch member 4b in the direction of being brought into proximity to the interlocking member 9. Thus, when the pressure member 5 is located at the non-actuation position, engine brake can be applied by transmitting the rotational force on the side of the wheel to the side of the engine by bringing the driving clutch plates 6 and the driven clutch plates 7 into press contact with each other. Actuation using the weight members 8 can be performed stably when engine brake is applied.

The back torque transmission cam according to the present embodiment includes the cam surfaces (K1 and T1) that are formed integrally with the first clutch member 4a and the second clutch member 4b, respectively. The cam surfaces (K1 and T1) are formed on the respective mating surfaces of the first clutch member 4a and the second clutch member 4b. Thus, the second clutch member 4b can be moved reliably and smoothly by the back torque transmission cam.

Further, the press-contact assist cam includes the gradient surfaces 4aa, formed on the first clutch member 4a, and the gradient surfaces 5a, formed on the pressure member 5, facing each other. This increases the press-contact force between the driving clutch plates 6 and the driven clutch plates 7 when the rotational force that is input to the input gear 1 (input member) can be transmitted to the output shaft 3 (output member). Thus, the press-contact force due to the press-contact assist cam can be applied in addition to the press-contact force due to movement of the weight members 8 due to a centrifugal force. This brings the driving clutch plates 6 and the driven clutch plates 7 into press contact with each other more smoothly and reliably.

Furthermore, the back torque limiter cam includes the gradient surfaces 4ab, formed on the first clutch member 4a, and the gradient surfaces 5b, formed on the pressure member 5, facing each other. This can release the press-contact force between the driving clutch plates 6 and the driven clutch plates 7 when the clutch member (first clutch member 4a) and the pressure member 5 are rotated relative to each other with rotation of the output shaft 3 (output member) exceeding the rotational speed of the input gear 1 (input member). Thus, transmission of excessive power to the side of the engine via the input gear 1 can be avoided when the weight members 8 are located at the radially outer position. The back torque transmission cam is actuated before actuation of the back torque limiter cam. This enables actuation using the back torque transmission cam to be performed reliably.

With the present embodiment, additionally, the back torque transmission cam can bring the driving clutch plates 6 and the driven clutch plates 7 into press contact with each other by moving the second clutch member 4b when the pressure member 5 is located at the non-actuation position and a rotational force is input to the first clutch member 4a via the output shaft 3 (output member). The torque transmission portion is formed on each of the first clutch member 4a and the second clutch member 4b. It can transmit a rotational force transmitted to the second clutch member 4b to the first clutch member 4a not via the back torque transmission cam (cam surfaces K1 and cam surfaces T1). Thus, engine brake can be applied with the rotational force on the side of the wheel transmitted to the side of the engine by bringing the driving clutch plates 6 and the driven clutch plates 7 into press contact with each other when the pressure member 5 is located at the non-actuation position. Thus, power can be transmitted stably when the weight members 8 are moved to the radially outer position and the pressure member 5 is moved to the actuation position.

The movement amount restriction portion is formed on each of the first clutch member 4a and the second clutch member 4b. It restricts the amount of movement of the second clutch member 4b due to the back torque transmission cam. Thus, the second clutch member 4b can be moved by the back torque transmission cam within a set range.

Further, the projection F is formed on one of the first clutch member 4a and the second clutch member 4b. The torque transmission portion is formed from one side surface F1 of the projection F and the first abutment surface G1 that can abut against the one side surface F1 to receive a rotational force. The the movement amount restriction portion is formed from the other side surface F2 of the projection F and the second abutment surface G2 that can abut against the other side surface F2 to restrict the amount of movement. Thus, the projection F can have the function of both the torque transmission portion and the movement amount restriction portion.

While the present embodiment has been described above, the present disclosure is not limited thereto. For example, as illustrated in FIGS. 25 and 26, the weight members 8 may be movably disposed in the housing portion 2a of the clutch housing 2. Also in this case, the back torque transmission cam is composed of the cam surfaces (K1 and T1) that are formed on the first clutch member 4a and the second clutch member 4b. When the pressure member 5 is located at the non-actuation position and a rotational force is input to the first clutch member 4a, via the output shaft 3 (output member), the back torque transmission cam can bring the driving clutch plates 6 and the driven clutch plates 7 into press contact with each other by moving the second clutch member 4b. The back torque transmission cam can hold abutment between the interlocking member 9 and the weight members 8 by moving the second clutch member 4b in the direction (leftward in FIG. 25) of being brought into proximity to the interlocking member 9.

The cam surfaces K1 and T1 that constitute the back torque transmission cam according to the present embodiment may be formed at different positions of the first clutch member 4a and the second clutch member 4b from those described above. Further, in the present embodiment, both the press-contact assist cam and the back torque limiter cam are provided in addition to the back torque transmission cam. However, only the press-contact assist cam may be provided, or neither of the press-contact assist cam and the back torque limiter cam may be provided.

Furthermore, in the present embodiment, the torque transmission portion and the movement amount restriction portion are provided. However, only one of the torque transmission portion and the movement amount restriction portion may be provided, or neither of the torque transmission portion and the movement amount restriction portion may be provided. The power transmission device according to the present disclosure is applicable to a variety of power transmission devices of a multi-plate clutch type for automobiles, three-wheeled and four-wheeled buggies, general-purpose machines, etc., besides two-wheeled vehicles.

INDUSTRIAL APPLICABILITY

The power transmission device has a first clutch member coupled to the output member. A second clutch member has attached driven clutch plates. A back torque transmission cam can bring the driving clutch plates and the driven clutch plates into press contact with each other by moving the second clutch member when the pressure member is located at the non-actuation position and a rotational force is input to the first clutch member via the output member. The back torque transmission cam can hold abutment between the interlocking member and the weight member by moving the second clutch member in a direction of being brought into proximity to the interlocking member. Also, the power transmission device can be applied to devices with different appearances or shapes, devices with other additional functions, etc.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
    a clutch housing rotatable together with an input member, the input member is rotatable by a drive force of an engine of a vehicle, a plurality of driving clutch plates attached to the clutch housing;
    a clutch member coupled to an output member that can rotate a wheel of the vehicle, a plurality of driven clutch plates attached to the clutch member, the driven clutch plates are alternately positioned with the driving clutch plates of the clutch housing;
    a pressure member movable between an actuation position and a non-actuation position, in the actuation position drive force of the engine can be transmitted to the wheel with the driving clutch plates and the driven clutch plates brought into press contact with each other, in the non-actuation position, transmission of the drive force of the engine to the wheel can be blocked by releasing a press-contact force between the driving clutch plates and the driven clutch plates;
    a weight member disposed in a groove portion in the clutch housing, the groove portion extend in a radial direction, the weight member is movable, by a centrifugal force due to rotation of the clutch housing, from a radially inner position to a radially outer position of the groove portion; and
    an interlocking member moving the pressure member from the non-actuation position to the actuation position as the weight member is moved from the radially inner position to the radially outer position;
    the clutch member comprising:
        a first clutch member coupled to the output member,
        a second clutch member attached to the driven clutch plates,
        a back torque transmission cam brings the driving clutch plates and the driven clutch plates into press contact with each other by moving the second clutch member when the pressure member is located at the non-actuation position and a rotational force is input to the first clutch member via the output member; and
    the back torque transmission cam can hold abutment between the interlocking member and the weight member by moving the second clutch member in a direction of being brought into proximity to the interlocking member.

2. The power transmission device according to claim 1, wherein the back torque transmission cam including respective cam surfaces formed integrally with the first clutch member and the second clutch member, and the cam surfaces are formed on respective mating surfaces of the first clutch member and the second clutch member.

3. The power transmission device according to claim 1, wherein the back torque transmission cam includes a plurality of cam surfaces formed along a circular ring shape of the second clutch member.

4. The power transmission device according to claim 1, further comprising a press-contact assist cam with a gradient surface, formed on the first clutch member, and a gradient surface, formed on the pressure member, facing each other, the press-contact assist cam increasing the press-contact force between the driving clutch plates and the driven clutch plates when a rotational force input to the input member can be transmitted to the output member.

5. The power transmission device according to claim 1, further comprising a back torque limiter cam with a gradient surface, formed on the first clutch member, and a gradient surface, formed on the pressure member, facing each other, the back torque limiter cam able to release the press-contact force between the driving clutch plates and the driven clutch plates when the clutch member and the pressure member are rotated relative to each other with rotation of the output member exceeding a rotational speed of the input member, and the back torque transmission cam configured to be actuated before actuation of the back torque limiter cam.

* * * * *